(12) United States Patent
Hunter et al.

(10) Patent No.: US 10,224,979 B1
(45) Date of Patent: Mar. 5, 2019

(54) RECONFIGURABLE APERTURE ANTENNA

(71) Applicant: Georgia Tech Research Corporation, Atlanta, GA (US)

(72) Inventors: William Hunter, Atlanta, GA (US); Bradford Baker, Atlanta, GA (US); Gregory Kiesel, Atlanta, GA (US); Efstrateos James Strates, II, Atlanta, GA (US); Matthew Habib, Atlanta, GA (US); Ryan S. Westafer, Fayetteville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 742 days.

(21) Appl. No.: 14/735,009

(22) Filed: Jun. 9, 2015

Related U.S. Application Data

(60) Provisional application No. 62/009,612, filed on Jun. 9, 2014.

(51) Int. Cl.
*H01Q 15/02* (2006.01)
*H04B 3/54* (2006.01)
*H04L 27/00* (2006.01)
*H01Q 13/04* (2006.01)
*H01Q 3/24* (2006.01)

(52) U.S. Cl.
CPC ............. *H04B 3/542* (2013.01); *H01Q 3/247* (2013.01); *H01Q 13/04* (2013.01); *H01Q 15/02* (2013.01); *H04L 27/0002* (2013.01)

(58) Field of Classification Search
CPC .. H01Q 9/0414; H01Q 9/0442; H01Q 19/005; H01Q 21/0006; H01Q 21/061
See application file for complete search history.

(56) References Cited

U.S. PATENT DOCUMENTS

| 6,016,211 A * | 1/2000 | Szymanski | G02B 6/43 359/108 |
| 6,885,345 B2 * | 4/2005 | Jackson | H01Q 3/40 343/700 MS |
| 7,561,115 B2 * | 7/2009 | Zeng | H04L 41/0803 343/700 MS |
| 7,620,424 B2 | 11/2009 | Cetiner et al. | |

* cited by examiner

*Primary Examiner* — Hoang Nguyen
(74) *Attorney, Agent, or Firm* — Troutman Sanders LLP; Ryan A. Schneider

(57) ABSTRACT

Systems, methods, and devices relating to reconfigurable antennas are disclosed.

44 Claims, 28 Drawing Sheets
(20 of 28 Drawing Sheet(s) Filed in Color)

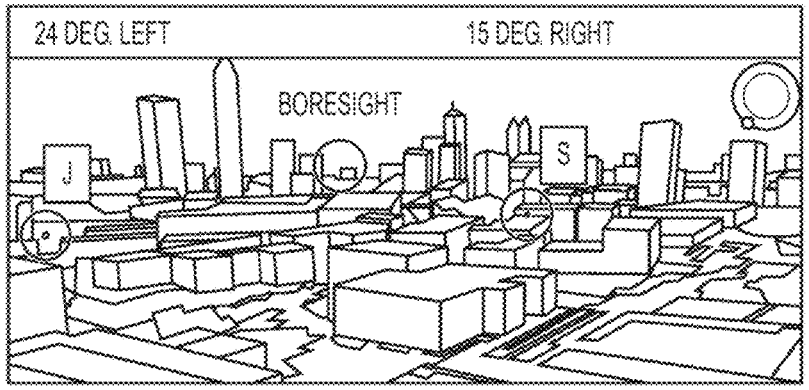
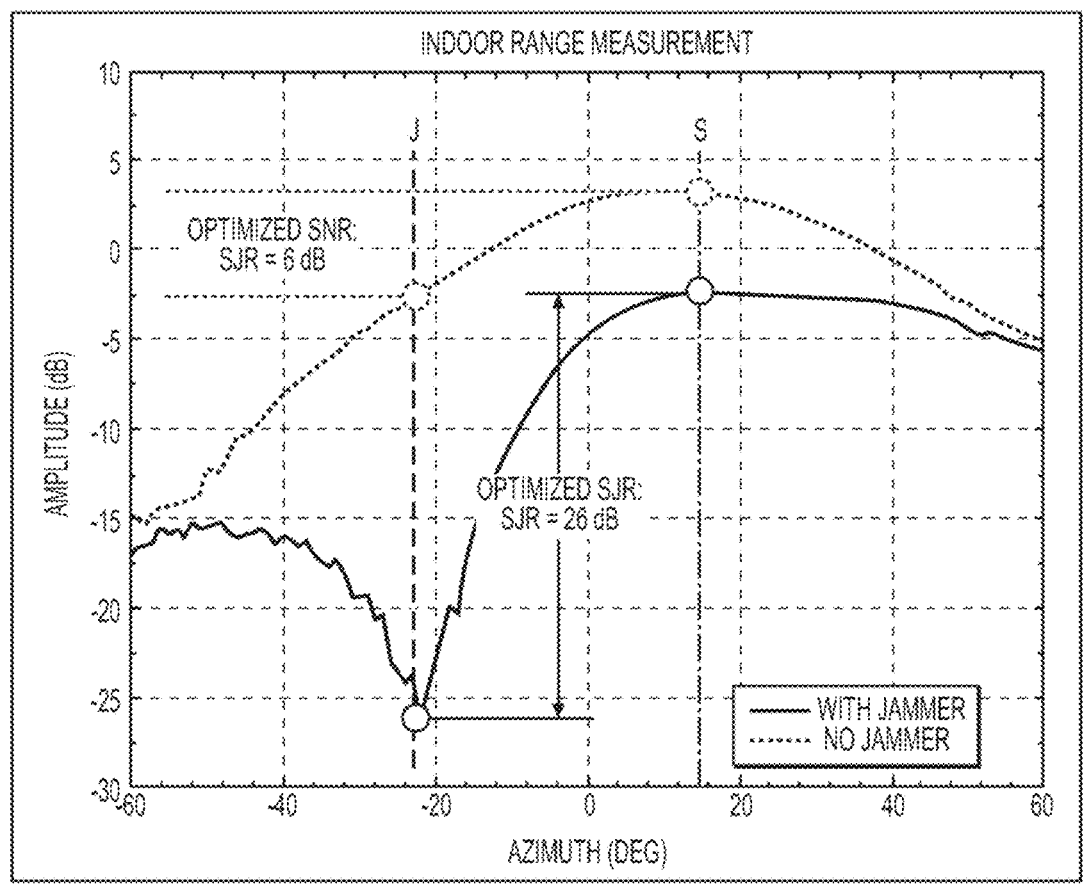
FIG. 6

US 10,224,979 B1

RECONFIGURABLE APERTURE ANTENNA

CROSS-REFERENCE TO RELATED APPLICATION

This Application claims priority to and benefit under 35 U.S.C. § 119(e) of U.S. Provisional Patent Application Ser. No. 62/009,612, filed Jun. 9, 2014, which is hereby incorporated by reference herein in its entirety as if fully set forth below.

STATEMENT OF RIGHTS UNDER FEDERALLY-SPONSORED RESEARCH

This invention was made in part with government support under contracts D6092, D7077, D6308, D6182.B.U., D6182.C.T., D6182.D.Q., and D6233. The government has certain rights in the invention.

FIELD OF THE INVENTION

Embodiments of the present invention relate generally to antennas, and more particularly to reconfigurable aperture antennas.

BACKGROUND OF THE INVENTION

Designing an antenna can be a complicated task because of the inherent properties of electromagnetics. Antenna engineers may physically scale or modify conventional antennas to best meet a particular application. However, in many instances, this approach is suboptimal because a suitable conventional antenna may not exist to meet a particular need. Antennas with broadband frequency coverage are desirable so the antenna can operate in a greater number of applications, but many conventional antennas with broadband coverage also have inadequacies that render them ultimately unacceptable.

For example, a multi-turn spiral antenna is a broadband antenna. However, the gain of the spiral antenna can be essentially flat with frequency. The optimal use of the aperture area may yield a gain that increases over frequency. Another example of a broadband antenna is the bow-tie antenna. A bow-tie antenna will radiate over a wide range of frequencies. Because the direction of radiation for the bow-tie antenna changes over the range of frequency, this feature may render the bowtie as suboptimal. Furthermore, static broadband antennas deliver, by definition, a broad spectrum of energy to the associated radio(s). Each radio may require a relatively narrow operating band at any given time, and therefore the majority may enter the radio front-end as noise. It is with respect to these and other considerations that embodiments of the present invention are directed.

BRIEF SUMMARY OF THE INVENTION

Some aspects of the present invention relate generally to the field of antennas, and more particularly to reconfigurable aperture antennas, which may in some embodiments described herein be referred to as an agile aperture antennas (A3). In comparison to existing technologies, various embodiments of A3 technologies as disclosed herein can provide advantages and benefits such as maximum gain comparable to horn, with bandwidth and frequency that is tunable, an antenna beam that can be steered, and a relatively thin and lightweight antenna. In comparison to a typical phased array antenna, agile aperture antennas according to embodiments of the present invention presented herein can also provide advantages and benefits with regard to power consumption, for example agile aperture antennas according to some embodiments of the present invention can be 80-90% power efficient, compared to 10-20% power efficiency of typical phase array antennas. These and other objects, features and advantages of the present invention will become more apparent upon reading the following specification in conjunction with the accompanying drawing figures.

BRIEF DESCRIPTION OF THE DRAWINGS

The patent or application file contains at least one drawing executed in color. Copies of this patent application publication with color drawing(s) will be provided by the Office upon request and payment of the necessary fee.

Reference will now be made to the accompanying drawings, which are not necessarily drawn to scale

FIG. 6 illustrates aspects of indoor range measurement for implementations of some embodiments of the present invention.

DETAILED DESCRIPTION OF THE INVENTION

Figure 1:
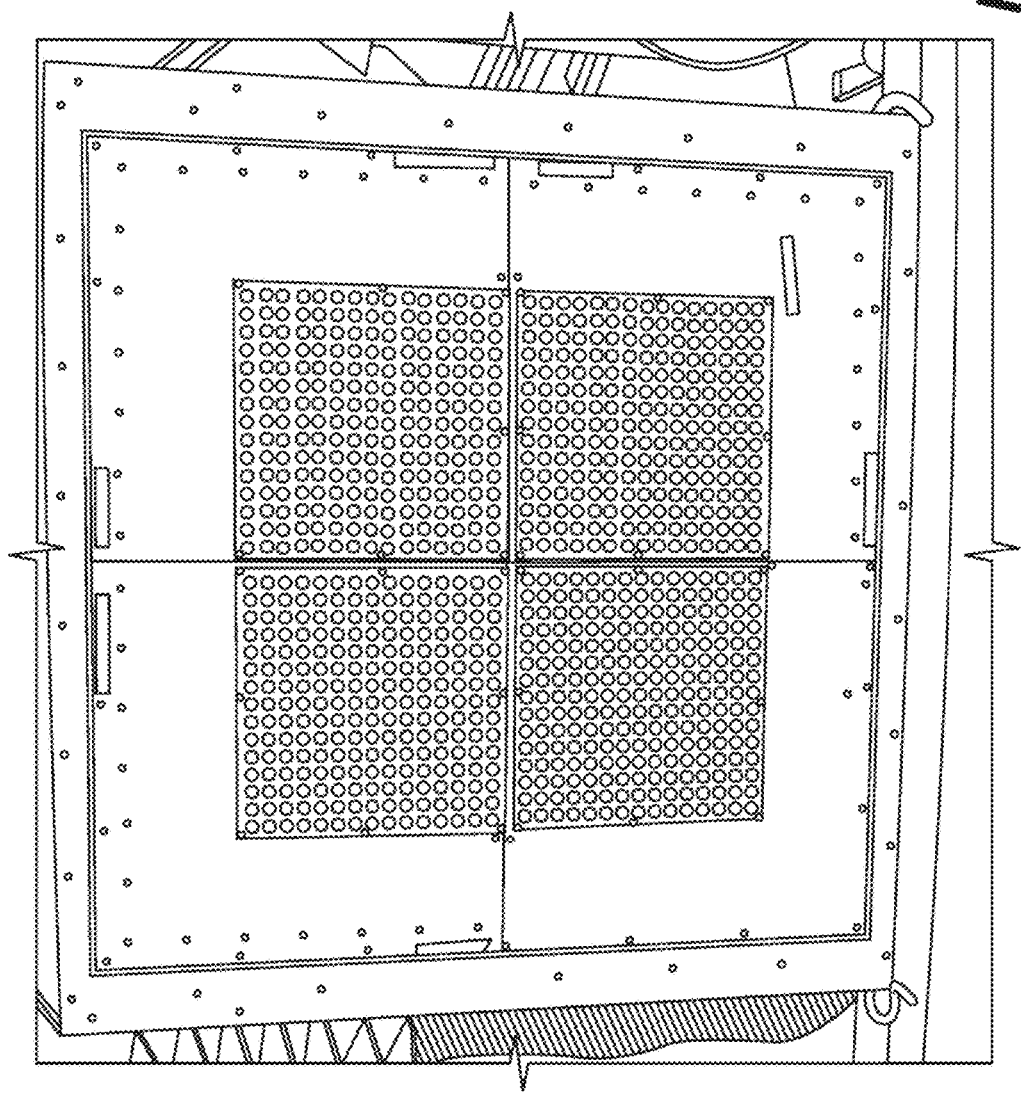
FIG. 1 illustrates a four element agile aperture antenna in accordance with an embodiment of the present invention.

The following detailed description is directed to systems, methods, and devices relating to reconfigurable antennas. Although exemplary embodiments of the present invention are explained in detail, it is to be understood that other embodiments are contemplated. Accordingly, it is not intended that the present invention is limited in its scope to the details of construction and arrangement of components set forth in the following description or illustrated in the drawings. The present invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Method steps may be performed in a different order than those described herein. Similarly, it is also to be understood that the mention of one or more components in a device or system does not preclude the presence of additional components or intervening components between those components expressly identified.

In the detailed description, references are made to the accompanying drawings that form a part hereof and that show, by way of illustration, specific embodiments or examples. In referring to the drawings, like numerals represent like elements throughout the several figures.

Some aspects of the present invention relate to element-level implementation of A3 technology. In some embodiments, inductive lines bring power and/or control to an element. A microcontroller and/or other complex logic device may be used to control a pixel, which can provide an ability to hold stage and provide a communication interface and a memory. Some embodiments can include addressable elements such that specific pixels can be individually controlled and programmed. Some embodiments can utilize presets to change states faster and more efficiently.

Aspects of board-level A3 technology in accordance with aspects of the present invention will now be described. In some embodiments, multiple pixels can be grouped on a board. In some embodiments, each pixel is a separate board (modular blocks). A pixel can consist of one set of control electronics to connect RF to neighbors. In some embodiments, the pixels may be individually addressable. In some embodiments, the pixels may have stored presets to allow for faster communication, changing multiple pixels in parallel. In some embodiments, ballooning pixels can be provided, for more resolution near a feed and less resolution away from the feed. This configuration can provide a more efficient use of antenna space, with more resolution provided near the more sensitive feed area. Some embodiments can provide a matrix style configuration, with an LCD style board layout with controls using passive components. Zener diodes may be used, and capacitors to hold charge, and each element can be periodically pulsed to maintain a switch state. This configuration may allow for a smaller footprint using commercial off-the-shelf parts. With regard to power and addressing for micros, some embodiments can use a voltage control scheme where a ground comes from the left side and power comes from the right side, and a special circuit may be used for setting address.

Some aspects of the present invention relate to non-planar configurations for A3 technology. The A3 may be conformal to a structure. The ground plane of an A3 can be reconfigurable, as well as the backplane, to improve steering to the horizon. A switched RF path to either forward board or back board can permit 360-degree coverage. Various lattices of A3 elements can be provided according to some embodiments, such as cubic, triangular, hexagonal, or generic configurations. Three-dimensional lattices may be used rather than planar (or conformal) rectangular grid arrangements. Multiple layer embodiments may be provided, for example with reconfigurable boards above a main driven layer ("wedding cake" arrangement). In these embodiments, reconfigurable, interconnected boards may be stacked.

Genetic algorithm (GA) methodology with A3 technology, in accordance with some aspects of the present invention, will now be described. Some embodiments may utilize top level concepts of GA with simulation or GA with mini-range. In some embodiments, a database may be used to store genetic code and/or algorithms. A known, good measured A3 antenna state may be used in some embodiments to help maintain system calibration over multiple days. Some embodiments may involve adapting the creep, mutation rate, and population size for the GA based on the number of switches, and versus generation time. Time gating and the number of frequency points taken may be used to speed up optimization time of the A3.

Application level embodiments, in accordance with some aspects of the present invention, will now be described. In some embodiments, A3 with integrated tracking inertial measurement unit (IMU) may be provided, and single feed direction finding. Some embodiments can employ multiple A3 antennas to triangulate/geolocate a signal. Some embodiments provide for in-situ optimization to produce optimum gain (including frequency and polarization match and/or angle), interference suppression, or some combination of these. An antenna controller may use radio feedback and a heuristic optimizer, for example GA, to optimize an antenna state for local siting, even mitigating backward installation by using reflector(s) of opportunity. For portable on-site training, embodiments may use inexpensive approaches to train an antenna to look in certain directions, for example using a handheld radio. For on-site direction finding calibration, in some embodiments an existing set of beams (antenna states) may be used, and the antenna controller can provide interactive calibration of the direction of arrival (DOA) estimation to correct for a local wireless multipath environment. Some embodiments may deliver DOA, signal strength, and other state information (including location, orientation, imagery, and video) to external devices for convenient display and control.

Some embodiments may provide pre-programmed null steering, for software defined radio integrated A3. Close integration may be used for programmable frequency hopping waveforms to eliminate de-sensing in front end and to eliminate co-site filters. Programmable gain may be used to eliminate front end saturation. A radio may provide feedback to an antenna controller, such as a quality figure of merit, for example signal to noise ration (SNR), signal to jammer ratio (SJR), and/or bit error rate (BER).

In some embodiments, stored antenna states may be weighted according to performance history, to provide a faster search of possible presets that may be used. Such embodiments may feature online optimization with high-speed, e.g., O(1) look-up, where an antenna controller can use data structure (e.g., priority queue or database) to store antenna states with weighting according to a number of times used, performance history, and the like. These embodiments may provide quick lookup of likely antenna states and thereby reduce search time associated with heuristic optimization (e.g., GA).

Some aspects of the present invention relate to passive feed and backplane concepts. Some embodiments may provide various geometries to get power onto an antenna more efficiently, including arrangements with a cone feed, hourglass feed, asymmetrical hourglass feed, or stepped feed/warped feed (discrete backplane levels). In some embodiments, a blunt conical/spherical backplane may be provided, with varied BP to antenna distance to lessen frequency dependency and improve side beams. Other embodiments may provide a flared bowtie feed on the board or a wire feed.

In some array embodiments, phasing of elements in an array can be done with different configurations of pixels, as opposed to using a time delay unit or a phase shifter. This can improve the gain available when steering an array of Agile Aperture Antennas.

Agile aperture configurations according to embodiments of the present invention can enable many uses that can be applied to SIGINT, RADAR, and EW, among other areas. Among other benefits and advantages provided: fast beam switching allows DF/GEO location of emitters from single aperture without requiring moving parts, low power personal area radar can be enabled enabled; and emerging low power techniques can be supported.

Aspects of A3 in accordance with embodiments of the present invention can learn in-situ to achieve site optimum. A software-defined radio can provide a FoM, for example SNR or SJR. A heuristic optimizer, for example GA, can create an improved antenna state (according to an improved radio FoM) within a few minutes, with the adaptive component having no knowledge of transmitted signal and/or polarization.

Figure 2:
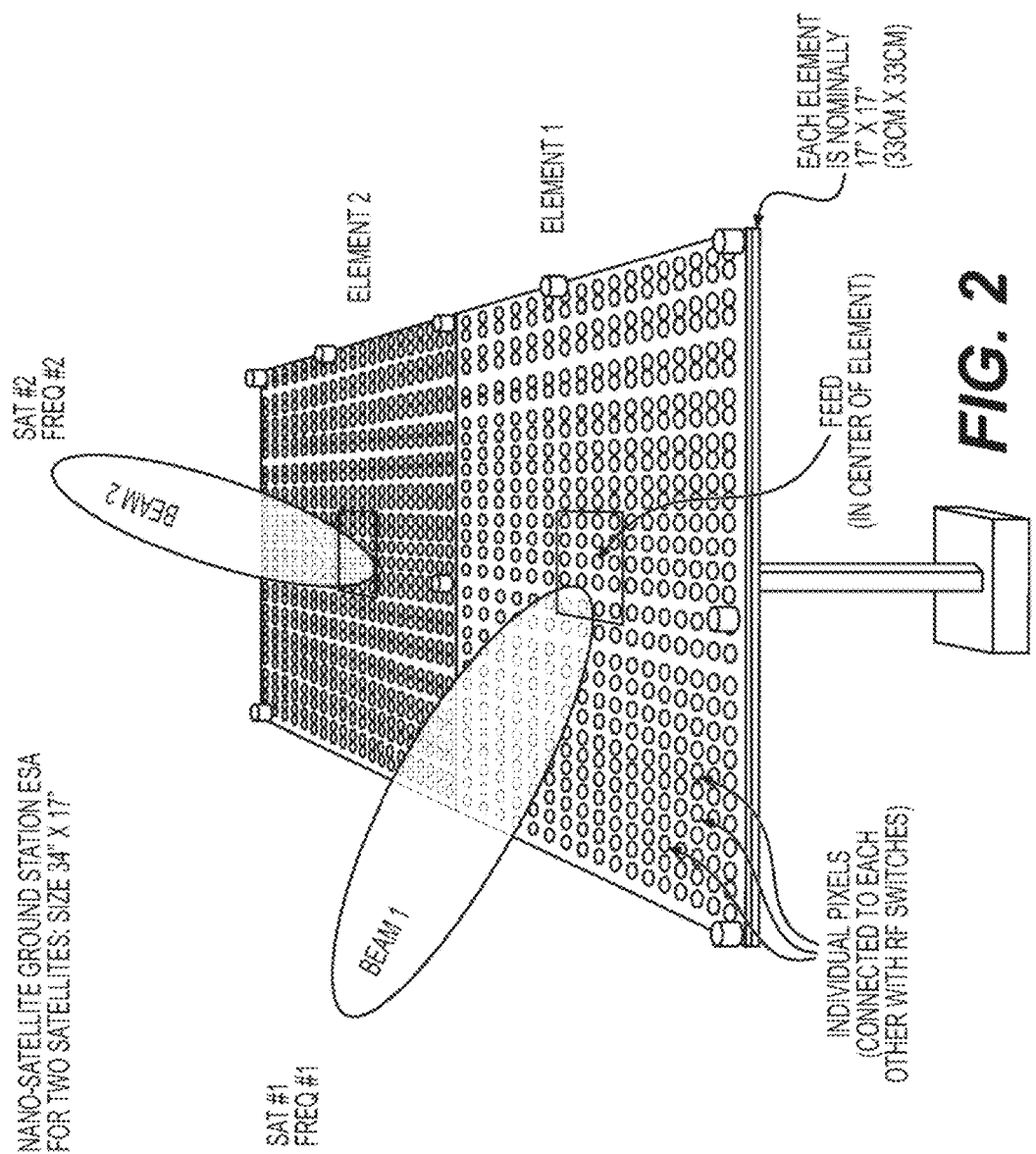
FIG. 2 illustrates a nano-satellite Ground Station ESA in accordance with an embodiment of the present invention.
Figure 3:
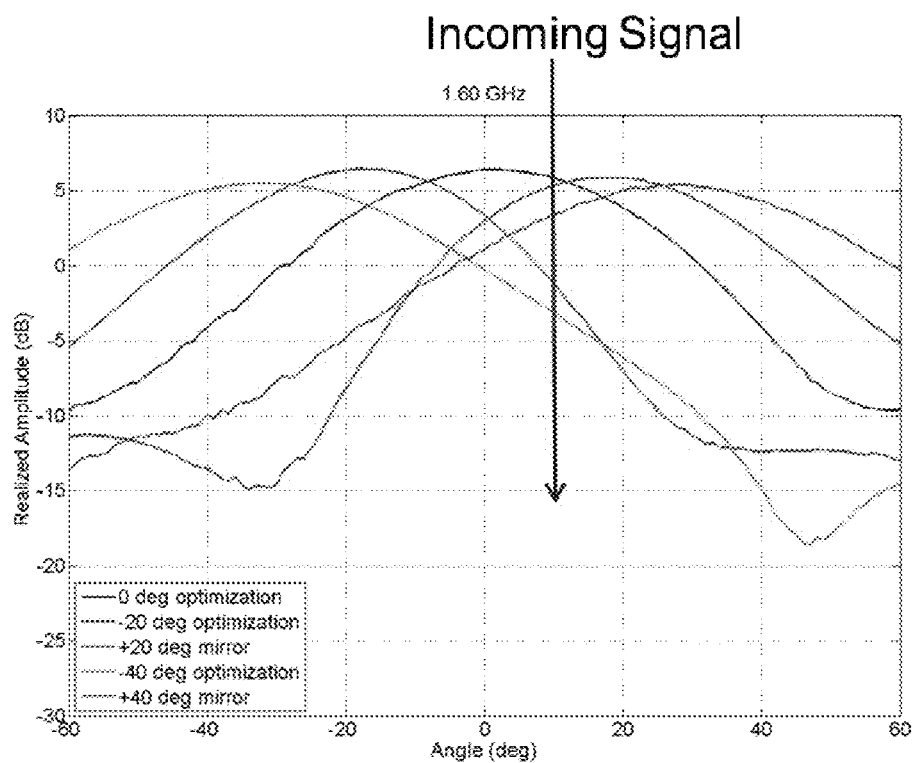
FIG. 3 illustrates realized amplitudes for various angles, in accordance with an embodiment of the present invention.
Figure 4:
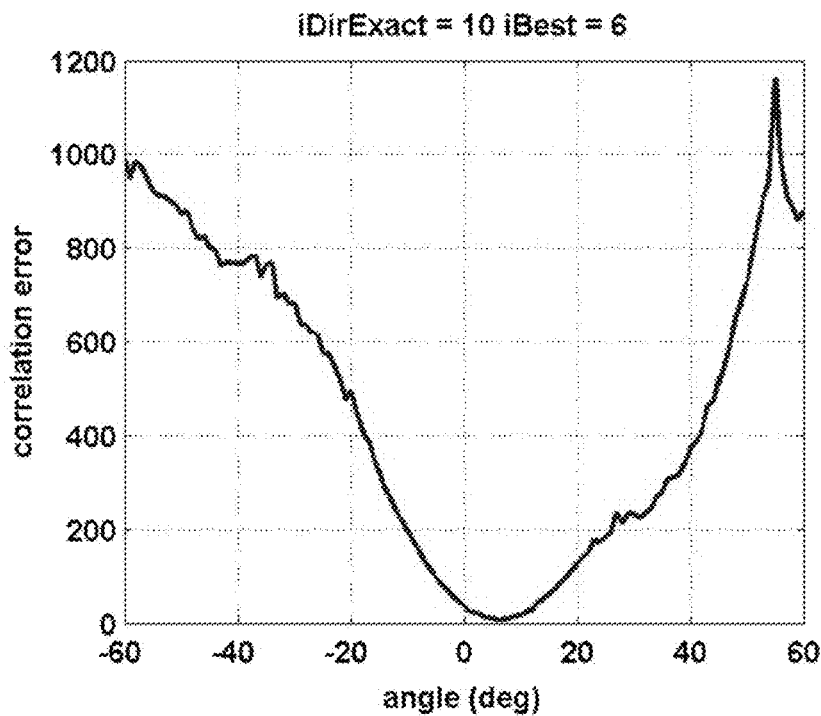
FIG. 4 illustrates correlation error for various angles, in accordance with an embodiment of the present invention.
Figure 5:
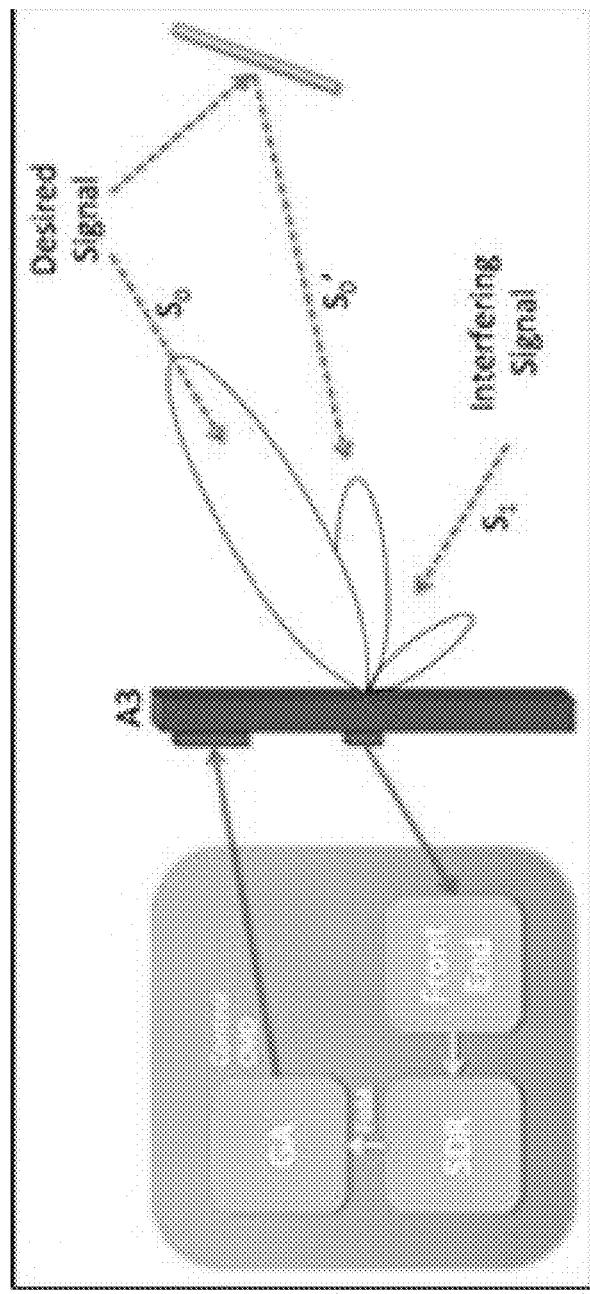
FIG. 5 illustrates aspects of adaptive A3 architecture, showing a system including an agile aperture antenna, in accordance with an embodiment of the present invention.

Aspects of the present invention will now be described in further detail with reference to the illustrations in FIGS. 1-33. FIG. 1 illustrates a four element agile aperture antenna, in accordance with an embodiment of the present invention, with one feed per quadrant. Each quadrant is independently steered through aperture reconfiguration or combined into one steered high gain beam. FIG. 2 illustrates a nano-satellite Ground Station ESA, in accordance with an embodiment of the present invention. FIG. 3 illustrates realized amplitudes for various angles, in accordance with an embodiment of the present invention. FIG. 4 illustrates correlation error for various angles, in accordance with an embodiment of the present invention. FIG. 5 illustrates aspects of adaptive A3 architecture, showing a system including an agile aperture antenna, in accordance with an embodiment of the present invention.

Figure 7:
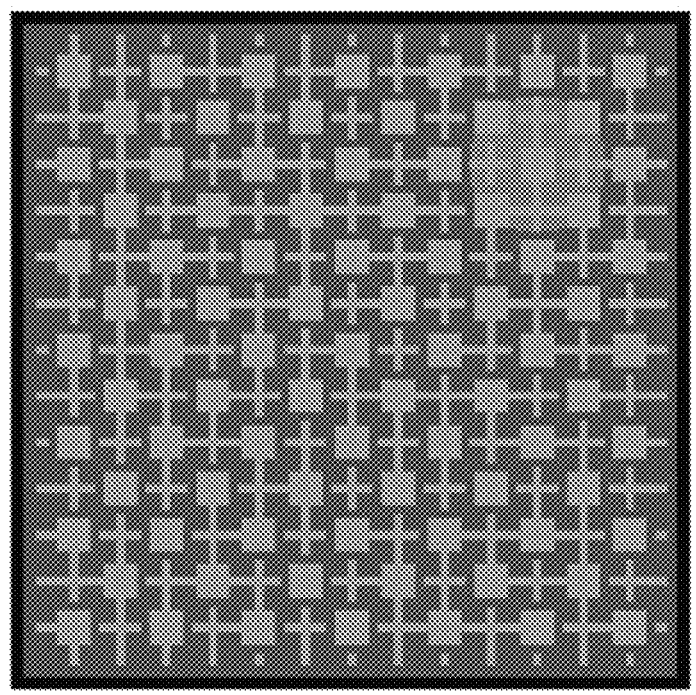
FIG. 7 illustrates an agile aperture configuration in accordance with an embodiment of the present invention.
Figure 8:
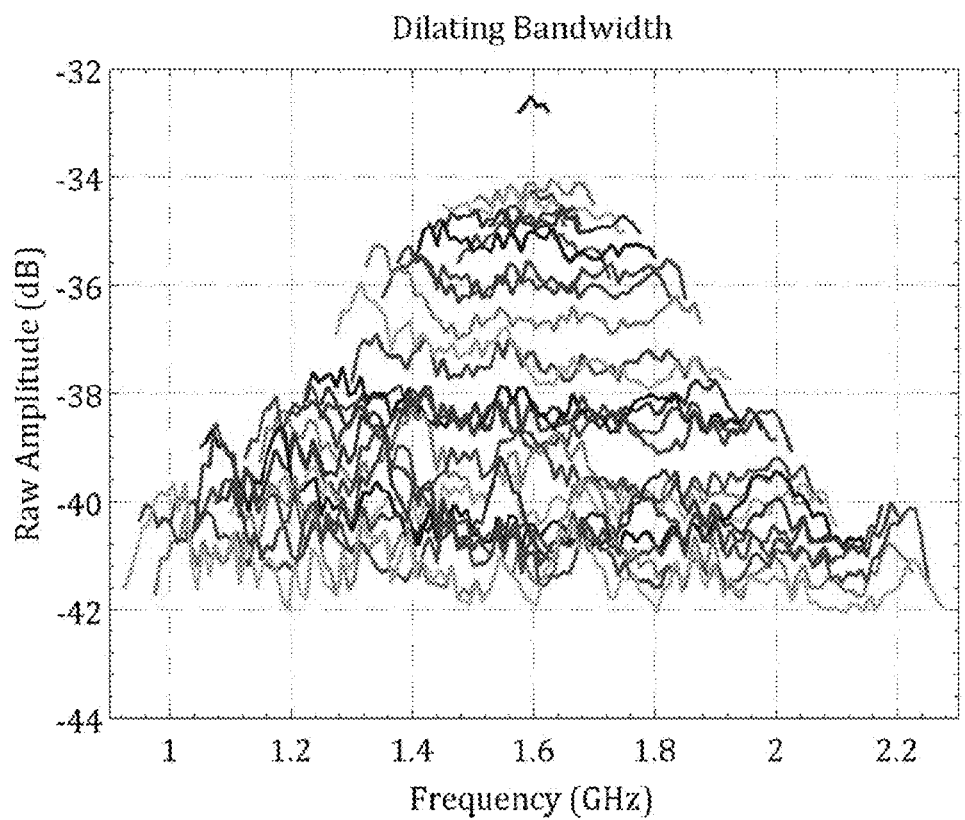
FIG. 8 illustrates aspects of broadside gain in accordance with an embodiment of the present invention.
Figure 9:
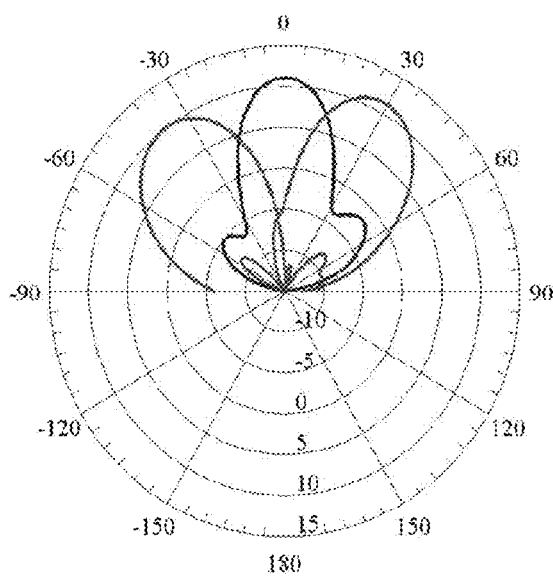
FIG. 9 illustrates polar plots generated at 2.45 GHz, of measured A3 data, in accordance with an embodiment of the present invention.

FIG. 6 illustrates aspects of indoor range measurement for implementations of embodiments of the present invention. FIG. 7 illustrates an agile aperture configuration in accordance with an embodiment of the present invention. FIG. 8 illustrates changing the broadside bandwidth, in accordance with an embodiment of the present invention. FIG. 9 illustrates polar plots generated at 2.45 GHz, of measured A3 data, in accordance with an embodiment of the present invention. Blue represents a −30 degree steer, green represents 0 degree steer, and red represents +30 degree steer.

Figure 10:
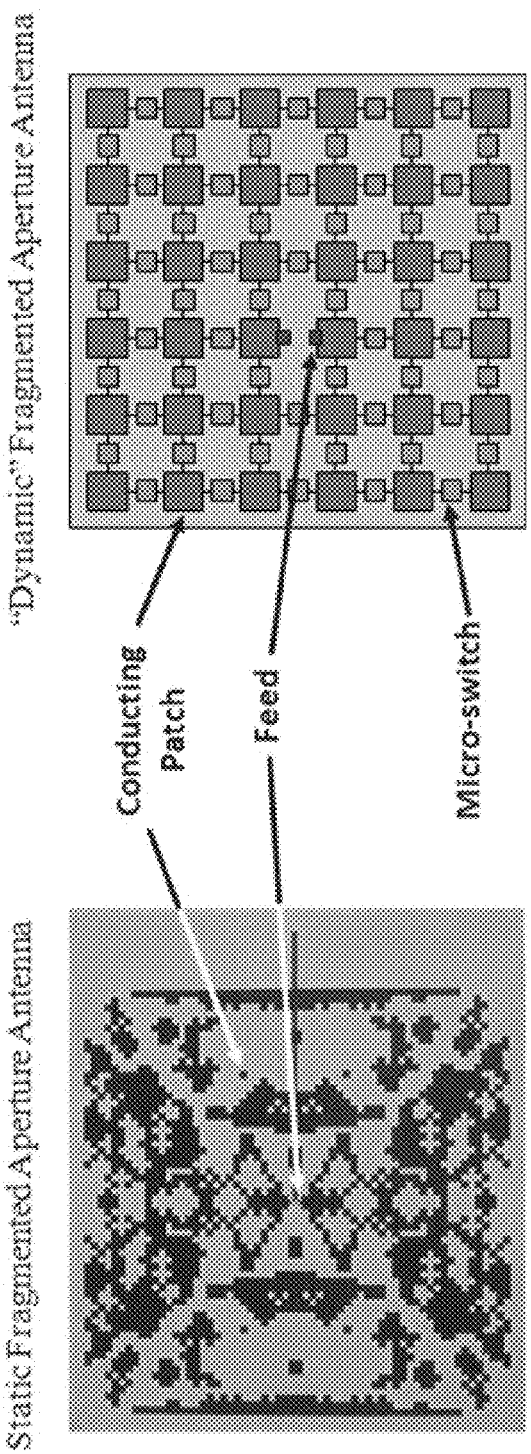
FIG. 10 illustrates a static fragmented aperture antenna (left) and a dynamic fragmented aperture antenna (right), in accordance with some embodiments of the present invention.
Figure 11:
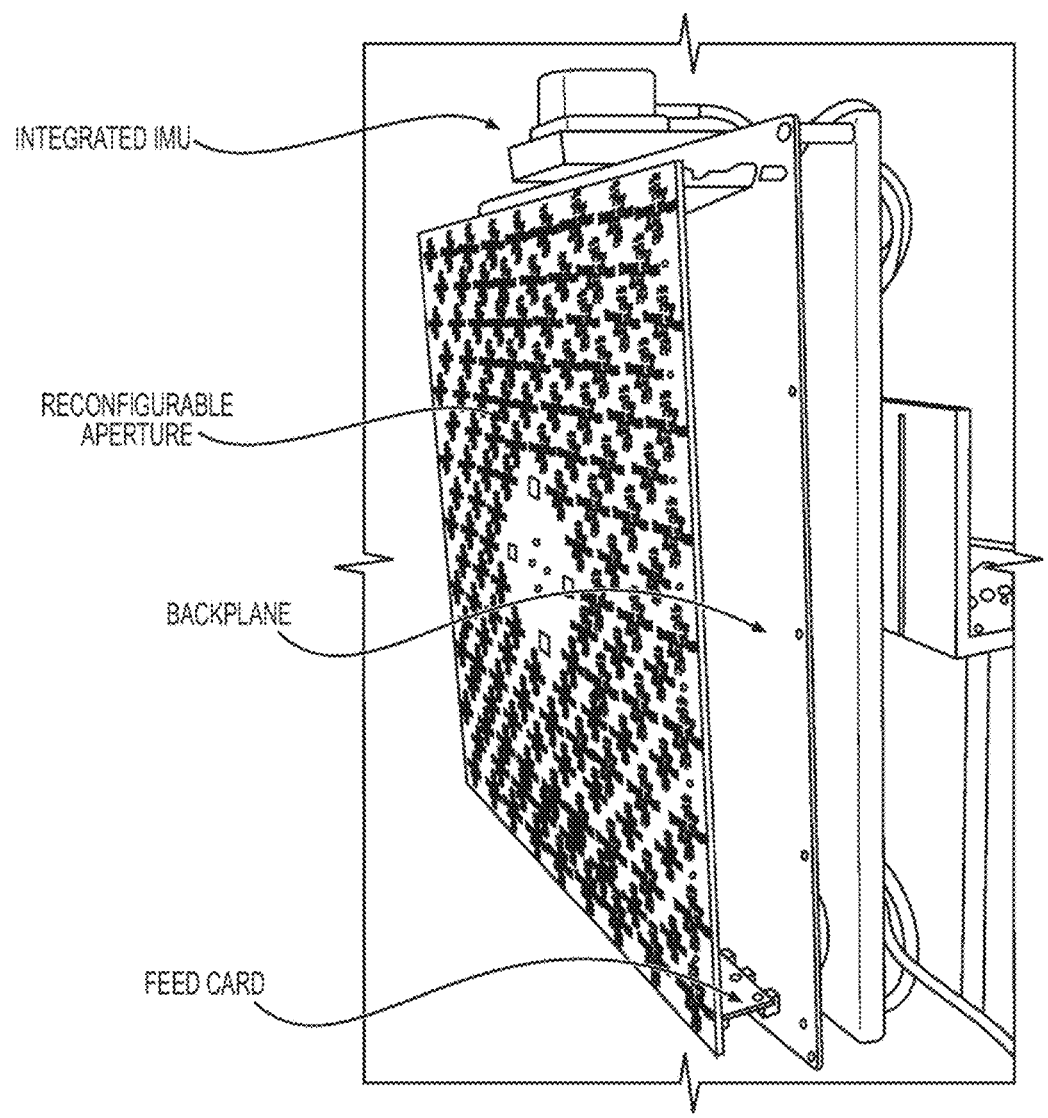
FIG. 11 illustrates an agile aperture system in accordance with an embodiment of the present invention.

FIG. 10 illustrates a static fragmented aperture antenna (left) and a dynamic fragmented aperture antenna (right), in accordance with embodiments of the present invention. Some aspects of agile aperture technologies are derived from fragmented aperture design. Aspects can provide developed individual, fixed patterns that span 15:1 bandwidth, and developed individual, reconfigurable patterns that span 5:1 bandwidth. FIG. 11 illustrates an agile aperture system in accordance with an embodiment of the present invention. An integrated IMU can find correct steering angle transparently to terminal. Also shown is the reconfigurable aperture and backplane with integrated balun and controllers on the other side. A feed card for DC power is modulated for control voltages.

Figure 12:
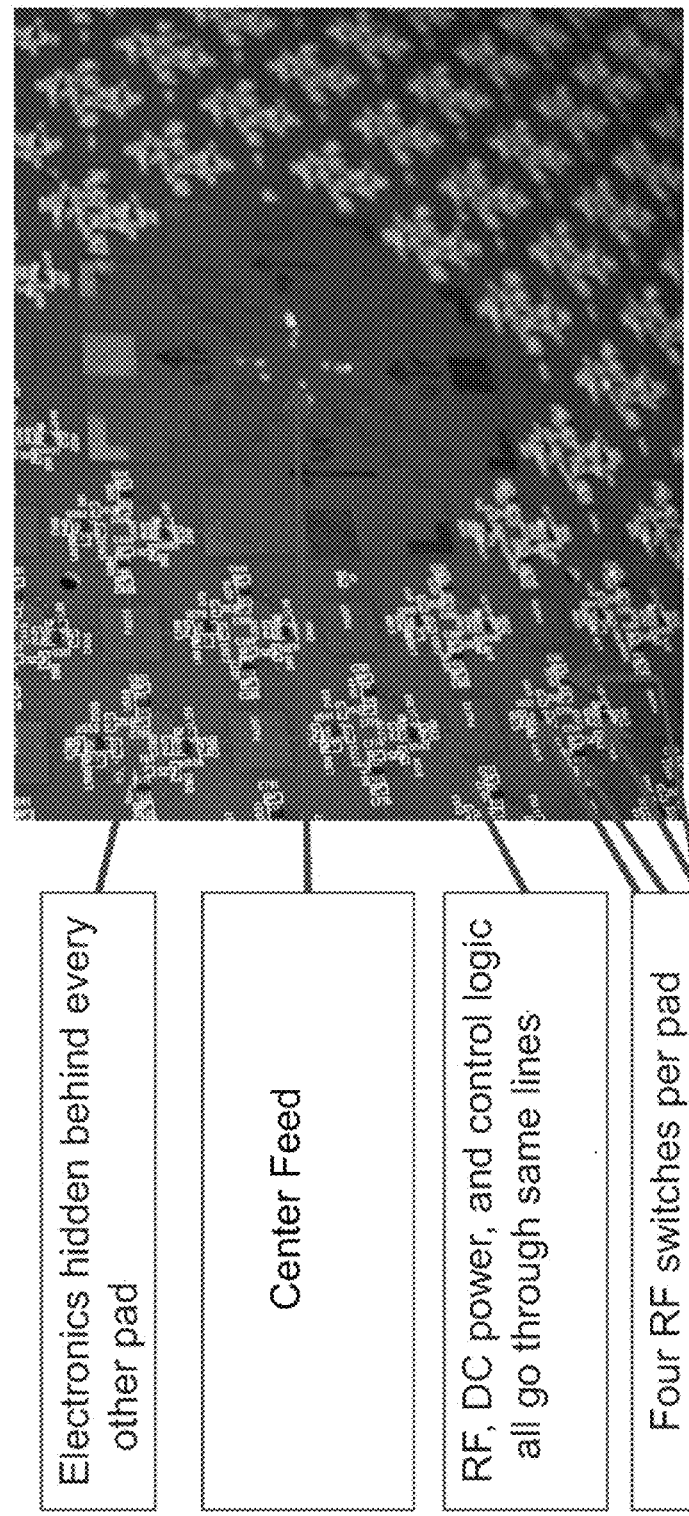
FIG. 12 illustrates an A3 antenna surface in accordance with an embodiment of the present invention.

FIG. 12 illustrates an A3 antenna surface according to an embodiment of the present invention. In this embodiment, electronics can be hidden behind every other pad, to provide greater efficiency, and the center feed can provide for good antenna match and improved robustness, with no single switch point of failure. RF, DC power, and control logic all go through the same lines, for no extra resistive parasitic. Four RF switches are provided per pad.

Figure 13:
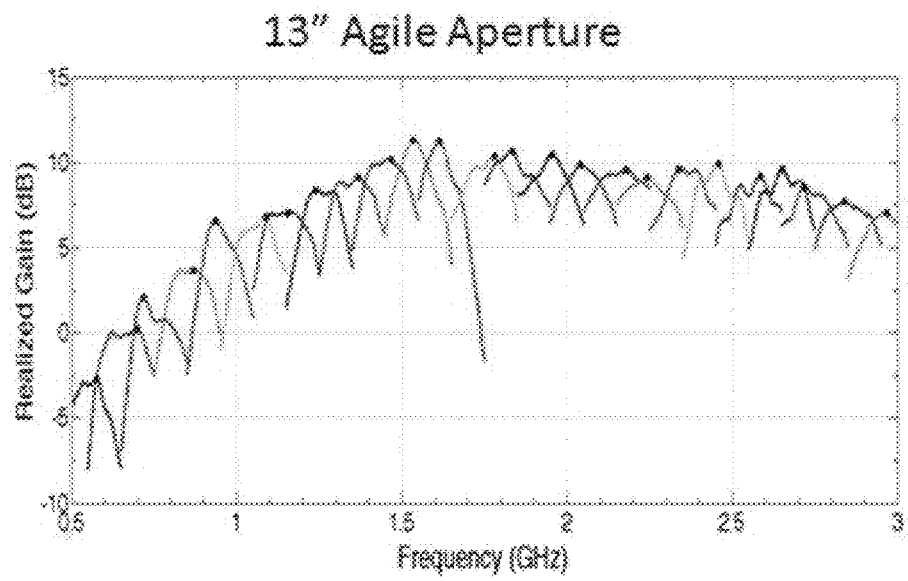
FIG. 13 illustrates realized gain for various frequencies, for a 13" agile aperture configuration in accordance with an embodiment of the present invention.
Figure 14:
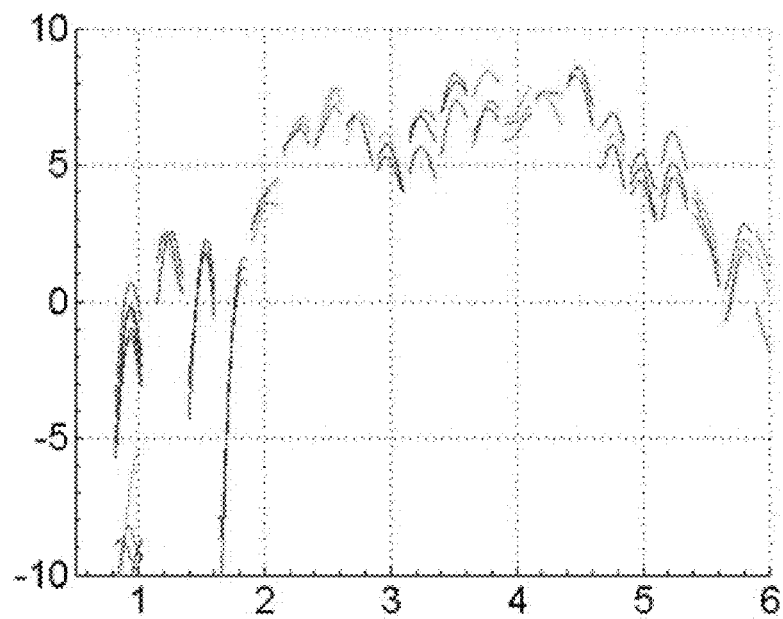
FIG. 14 illustrates aspects of realized gain for various frequencies, for a 6" agile aperture configuration in accordance with an embodiment of the present invention.
Figure 15:
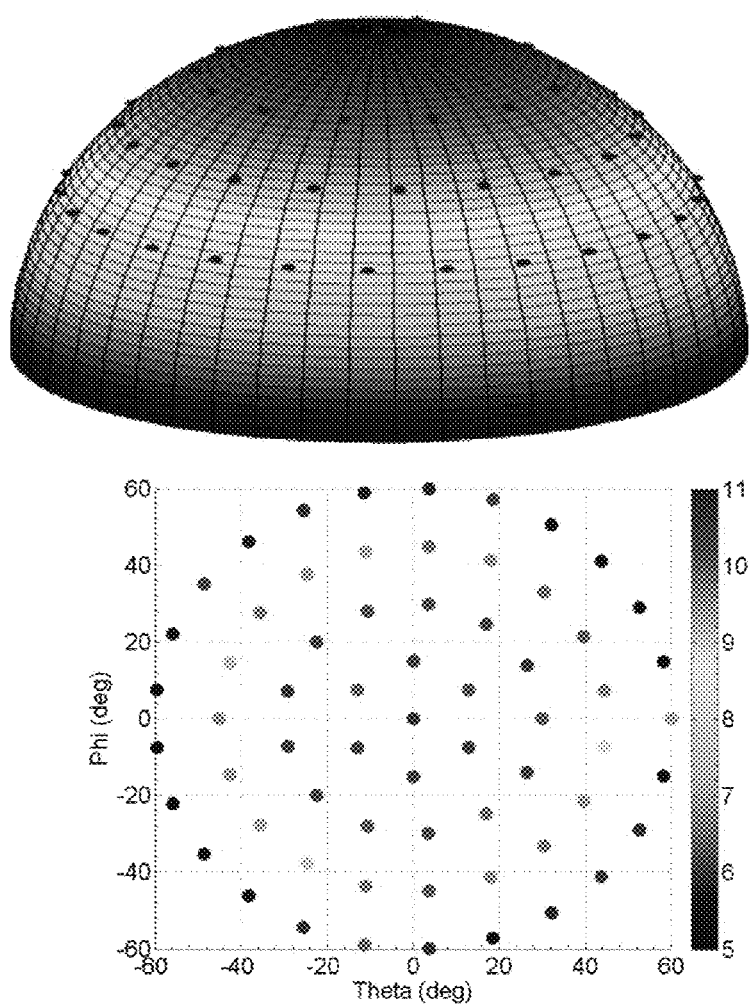
FIG. 15 illustrates aspects of steered beams in accordance with an embodiment of the present invention.

FIG. 13 illustrates realized gain for various frequencies, for a 13" agile aperture configuration in accordance with an embodiment of the present invention. FIG. 14 illustrates realized gain for various frequencies, for a 6" agile aperture configuration in accordance with an embodiment of the present invention. With regard to tunable frequency and polarization performance, each color curve shown represents gain for a different antenna configuration. Gain falls off at the low end due to aperture limit; at high end due to antenna geometry. Gain shown is V Pol; comparable gain values for H-Pol, slant linear, RHCP, and LHCP. FIG. 15 illustrates aspects of steered beams at InMarSat, in accordance with an embodiment of the present invention. Angles are chosen to fill 60° "latitude." One angle is at 90° (North Pole=broadside), six angles are at 80° latitude, and 26 angles are at 60° latitude. Beam centers are represented by blue dots, and colors on the hemisphere correspond with gain. The bottom plot shows gain of each steered beam by coloring the dots at the beam centers.

Figure 16:
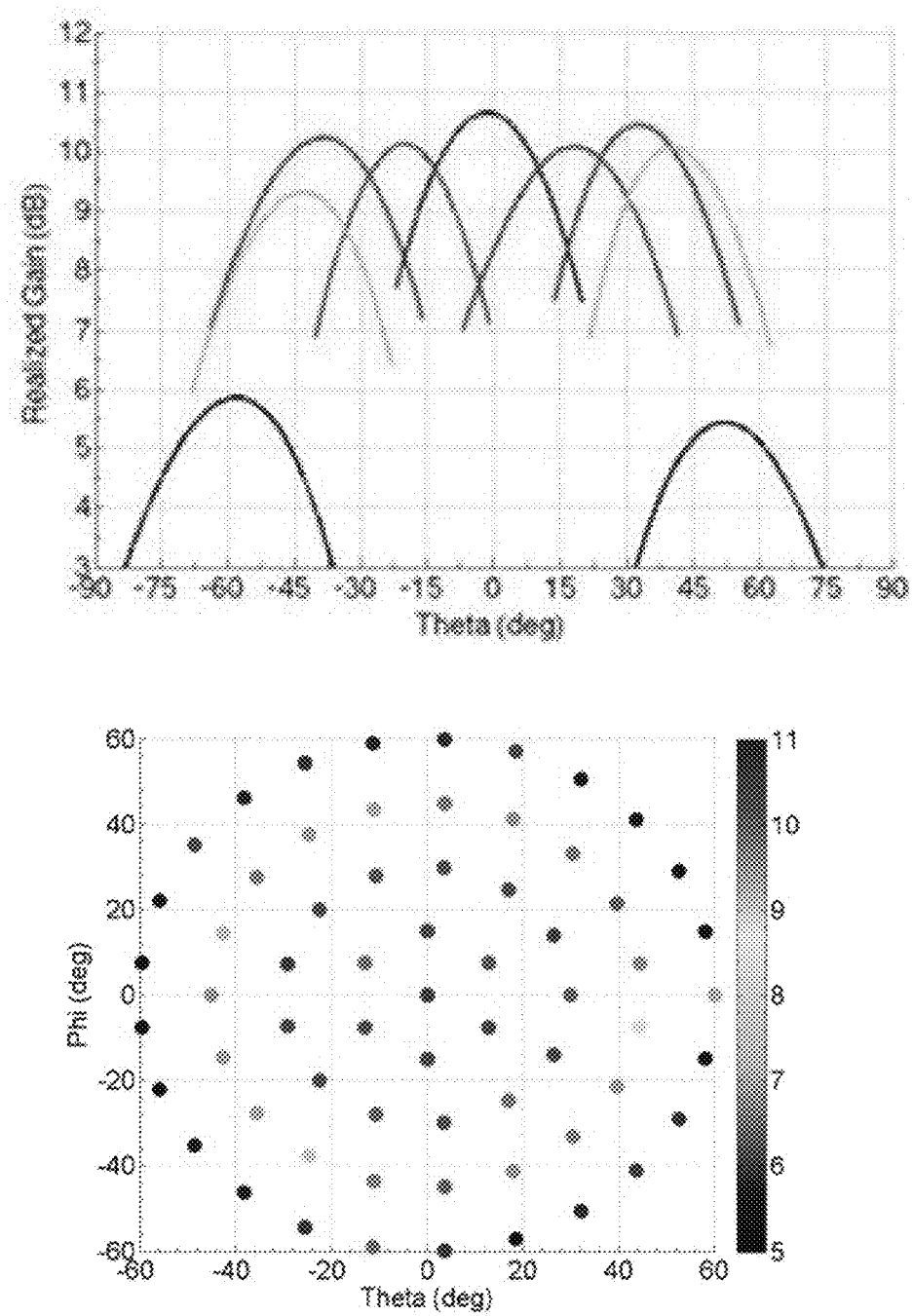
FIG. 16 illustrates aspects of beam shapes in accordance with some embodiments of the present invention.
Figure 17:
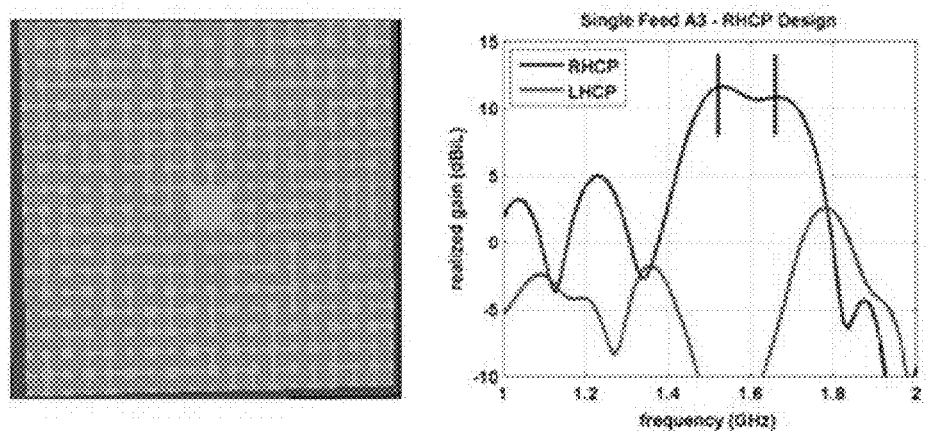
FIG. 17 illustrates aspects of polarization tuning for a single feed A3 RHCP design, in accordance with an embodiment of the present invention.
Figure 18:
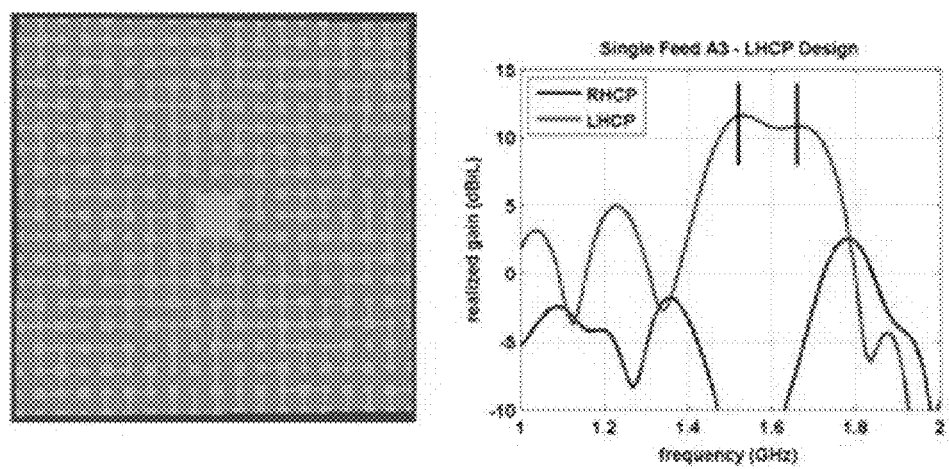
FIG. 18 illustrates aspects of polarization tuning for a single feed A3 LHCP design, in accordance with an embodiment of the present invention.

FIG. 16 illustrates aspects of beam shapes in accordance with embodiments of the present invention. The top plot shows realized gain for various degrees (Theta), and the bottom plot shows degrees (Phi) for various degrees (Theta), showing an azimuth curve to the 3 db point for beams along the diagonal, with can provide for good directivity for various beams throughout the field of view. FIG. 17 illustrates aspects of polarization tuning for a single feed A3 RHCP design, according to an embodiment of the present invention. FIG. 18 illustrates aspects of polarization tuning for a single feed A3 LHCP design, according to an embodiment of the present invention. According to certain aspects of the present invention, reconfigurable polarization can be demonstrated with minimal gain differences between RHCP, LHCP, H-Pol, V-Pol, +45 slant linear, and −45 slant linear.

Figure 19:
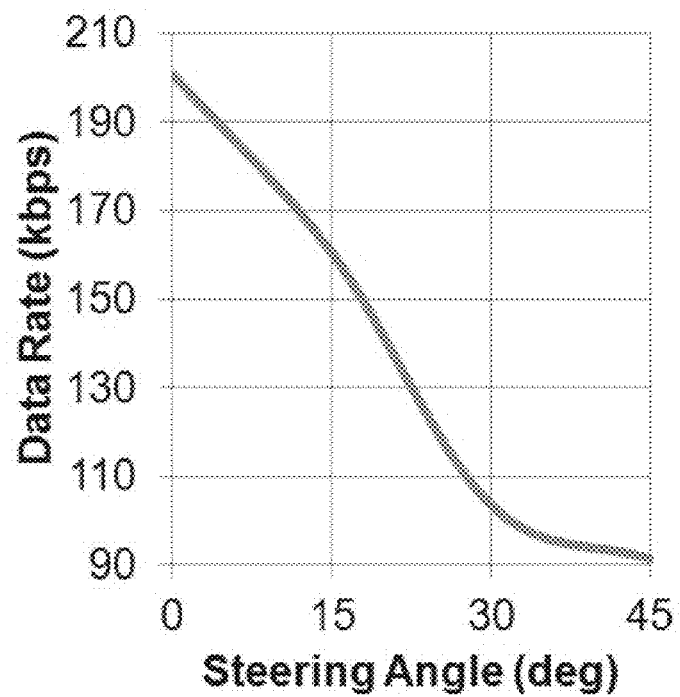
FIG. 19 illustrates data rates for different beams, at various steering angles, in accordance with some embodiments of the present invention.
Figure 20:
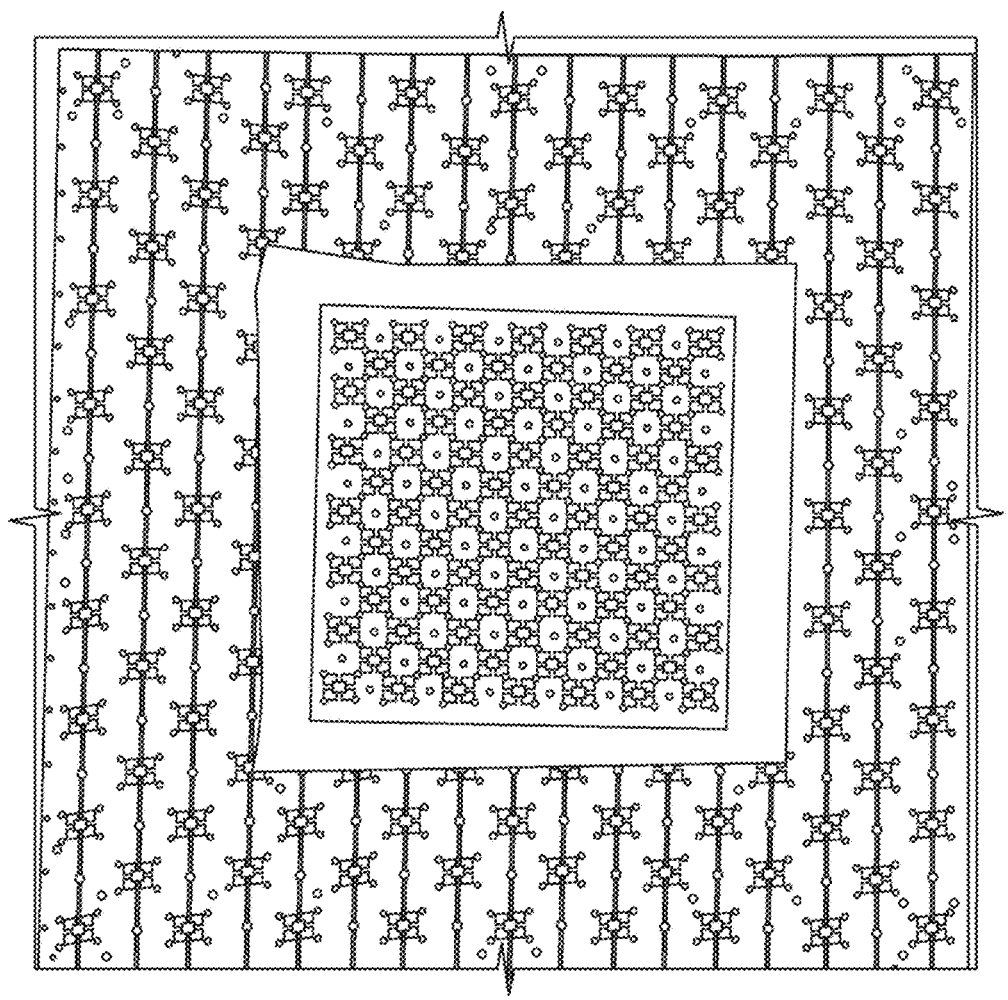
FIG. 20 illustrates aspects of single elements with agile aperture technology according to some embodiments of the present invention.

FIG. 19 illustrates data rates for different rates of steering angle (related to degrees per second), according to embodiments of the present invention. An antenna can be steered while in tracking mode, with a best data rate at slow angular rotation. As shown, packets are dropped as the antenna changes beam during transmit and receive packets. An additional feature is that by synchronizing when the antenna changes beam with the packets, the number of packets dropped can be reduced and much of the data rate can be recovered. FIG. 20 illustrates aspects of agile aperture technology according to further embodiments, with an objective of providing an auto-pointing patch-type antenna. A larger form factor element (background) is shown along with a reduced 6" form factor element (foreground). Some embodiments may have a smaller 6" form factor in comparison to other embodiments, with tight pixel spacing for higher band. Thousands of patterns can provide for large memory, and the embodiments may use a flexible antenna interconnect. In comparison to other 13" square embodiments, the size may be reduced to 6" square, and thickness can be 1.5" to 0.75". The 6" form factor elements can have an increased upper frequency of 1 GHz to 5+ GHz.

Some aspects of the present invention relate to element-level implementation of A3 technology. In some embodiments, a pixel (which may also be referred to herein as a "smart pixel") is a fundamental design element of an antenna, and may include one or more switches with the components needed to control the switches. Some embodiments relate to methods for bringing power, control, and/or RF to the pixel, and some embodiments relate to the implementation of the control elements of the pixels. Additional embodiments relate to specific techniques that are enabled by a smart pixel.

In some embodiments, one or more inductive or resistive sets of lines are used to bring digital control, power and digital controls, or power, digital controls and RF to the pixel (see FIG. 12). In some embodiments, an inductive and/or resistive trace can allow one trace to control more than one pixel. In some embodiments, an inductive and/or resistive mesh can be used to allow one trace to control more than one pixel. Some such embodiments of the present invention can provide advantages over conventional approaches in which the number of control lines needed is significantly greater and makes large reconfigurable antennas impractical. Additionally, the ability to use a regular grid, in accordance with some embodiments of the present invention, simplifies the layout process since lines do not need to be individually routed to pixels. The ability to connect neighboring pixels also enables modular designs that can be made up of single pixel boards. Some embodiments bring power and ground to each side or to each corner, for arbitrary connections. In some embodiments, a set of power lines and ground lines are routed orthogonally to minimize the number of parasitic lines.

Figure 21:
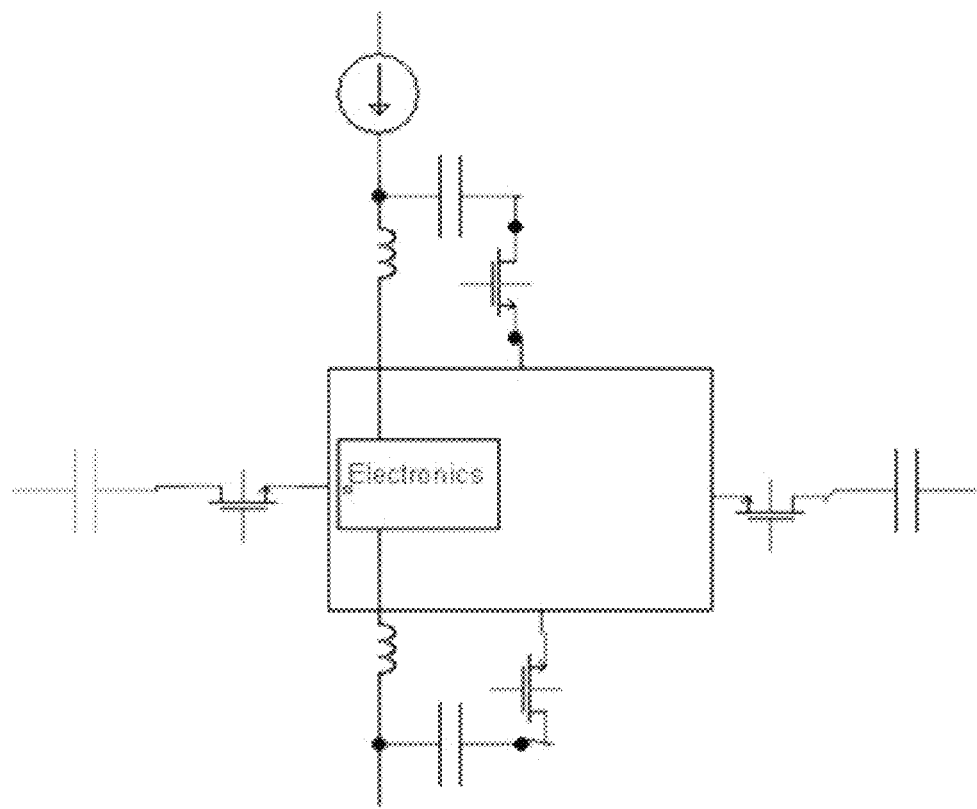
FIG. 21 illustrates a power line configuration in accordance with an embodiment of the present invention.

FIG. 21 is a diagram of a power line configuration in accordance with an embodiment of the present invention, in which a modulated current source provides DC power and the current waveform is decoded to a digital signal. Inductors and/or resistors can be used to keep RF from the electronics, and capacitors can be used to keep DC from the switches. In some embodiments, a voltage regulator can be used to switch high voltages needed for the switches (such as MEMS) to lower voltages needed for control logic. In some embodiments, a voltage regulator can be used to increase the voltage to a level needed for a switch such as a MEMS.

Some aspects of the present invention relate to the use of complex logic devices on pixels such as microcontrollers, CPLDs, FPGAs, ASICS, or DSP chips to provide control on the pixel. In some embodiments, a complex logic device is used which is able to decode digital signals sent to the pixel and translate the decoded signals into switch states. These control signals can be sent over inductive or resistive lines. Alternatively, the control signals can be sent using optical or wireless techniques. Some embodiments provide for the ability to transmit a signal from one pixel to another even if the pixels are not connected in parallel. In some embodiments, the pixels can include presets for faster communication. Some embodiments can use UART style faster communication and can use PWM or Manchester encoding to provide for power improvements.

Figure 23:
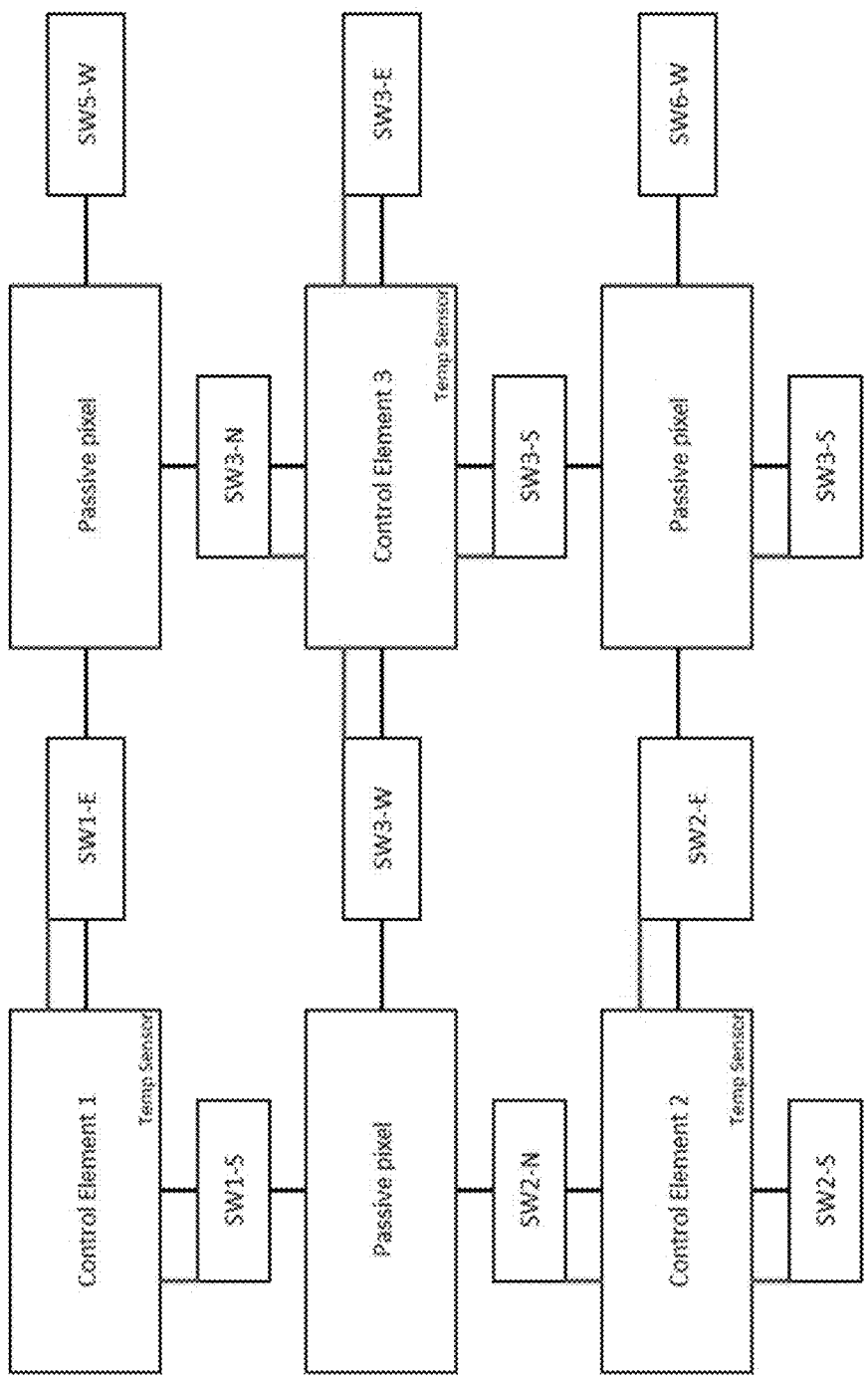
FIG. 23 illustrates pixels with multiple switches connected to a single pixel and temperature sensors embedded in active pixels, in accordance with an embodiment of the present invention.

In some embodiments, a complex logic device provides pixels that are individually addressable and broadcast addressable to enable multiple pixels to be communicated to in parallel for faster communication. In some embodiments, complex logic addresses are used to communicate with multiple switches on a pixel. FIG. 23 shows pixels with multiple switches connected to a single pixel, and also shows temperature sensors embedded in the active pixels, according to an embodiment of the present invention. As shown, smart pixels can be staggered with passive pixels, which in comparison to conventional approaches can cut down on the number of parts and/or power while maintaining the desired switch density.

In some embodiments, parallel communication is enabled through individual traces, through a common bus, by having more than one pixel optically stimulated by a common source, or by having more than one pixel wirelessly coupled from a common source. Commands can be designated for an individual pixel, a group of pixels, or the entirety of pixels. In some embodiments, a clock can be delivered on a separate channel. In some embodiments, an asynchronous communication scheme can be used to eliminate the need for a clock signal. The asynchronous signal can use a timed series of bits, and the signal can have a DC bias which allows power and communication to travel on the same line. The asynchronous signal can use pulse encoding, which provides benefits that include reducing the required accuracy needed of the clocks on the pixel and to increase the average DC bias.

Some aspects of the present invention relate to the use of error correction and/or error detection in the communication with the pixels. Some schemes for communicating to the pixel may subject the control signal to degradation, whether through inductors, resistors, free space, or other medium. In some embodiments, error detection can be used to reject an invalid command. In some embodiments, a method for error detection is to take a communication packet and reject for parity errors. An example of error correction is to take a communication packet and use a linear error correcting code (e.g., a Hamming code) and fix bit errors. By detecting and/or correcting from bit errors, the antenna can be kept from incorrect states and overall communication rates can be increased without impact to reliability.

Some aspects of the present invention relate to bidirectional communication schemes, including, in some embodiments, the use of bidirectional communication schemes with the pixel, from a controller to the pixel, and the use of bidirectional communication schemes between pixels. Some embodiments can use a bidirectional scheme to allow pixels to acknowledge commands and to report state information such as the current switch states. Some embodiments can use bidirectional communication schemes to transmit sensor information received locally from the pixel, and to transmit local switch states from memory. Some embodiments include the specific use of bidirectional communication schemes to transmit optimized states from the pixel to a controller.

Figure 22:
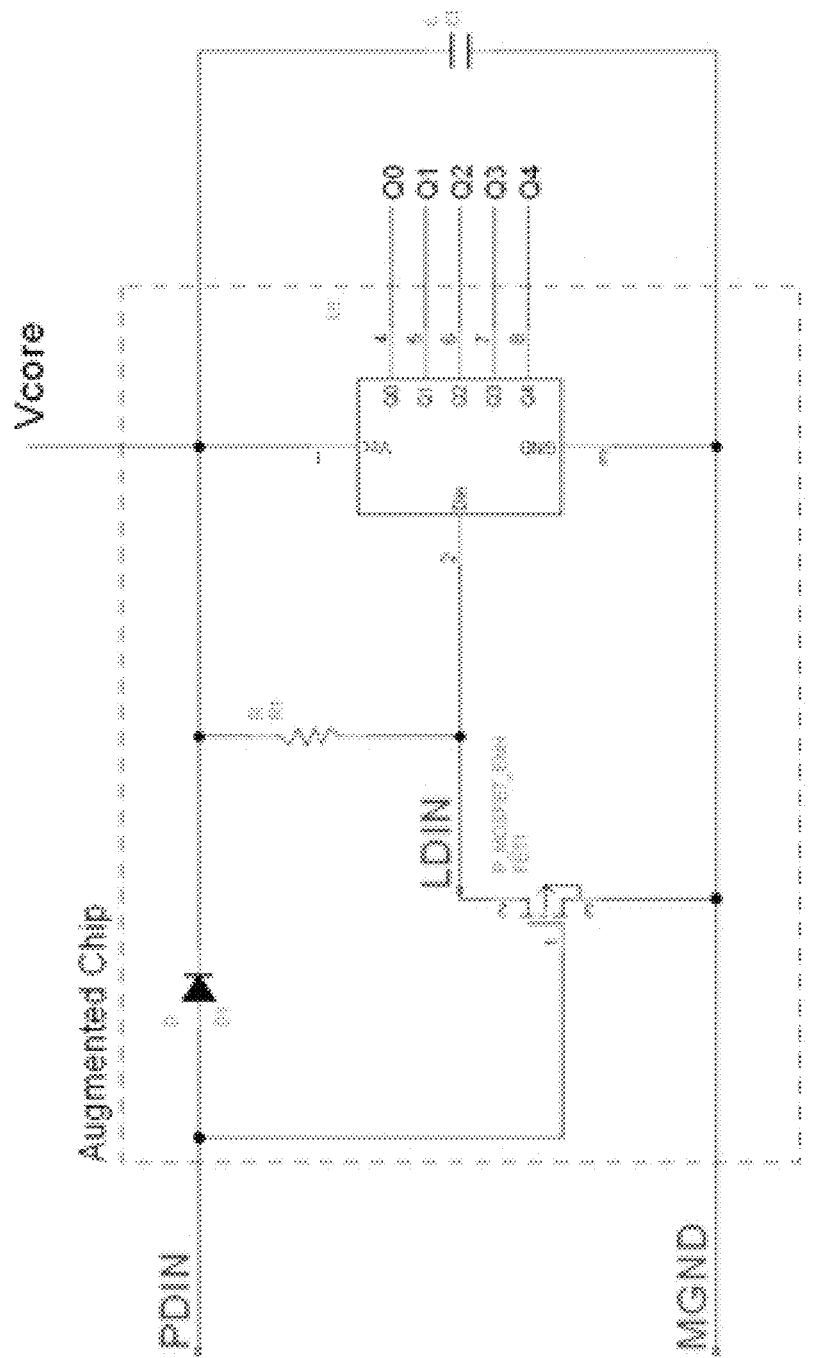
FIG. 22 illustrates a current limiting device using a resistor, in accordance with an embodiment of the present invention.
Figure 24:
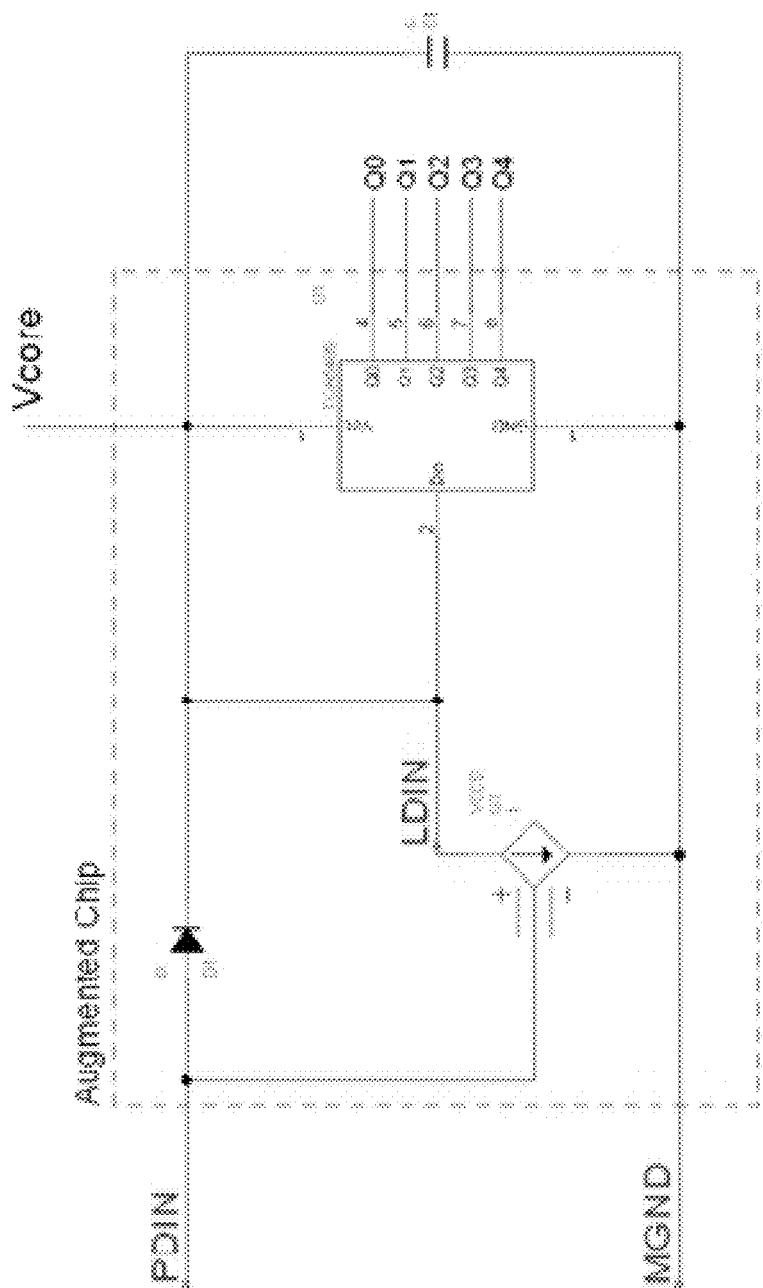
FIG. 24 illustrates a current limiting device using a current sink, in accordance with an embodiment of the present invention.
Figure 25:
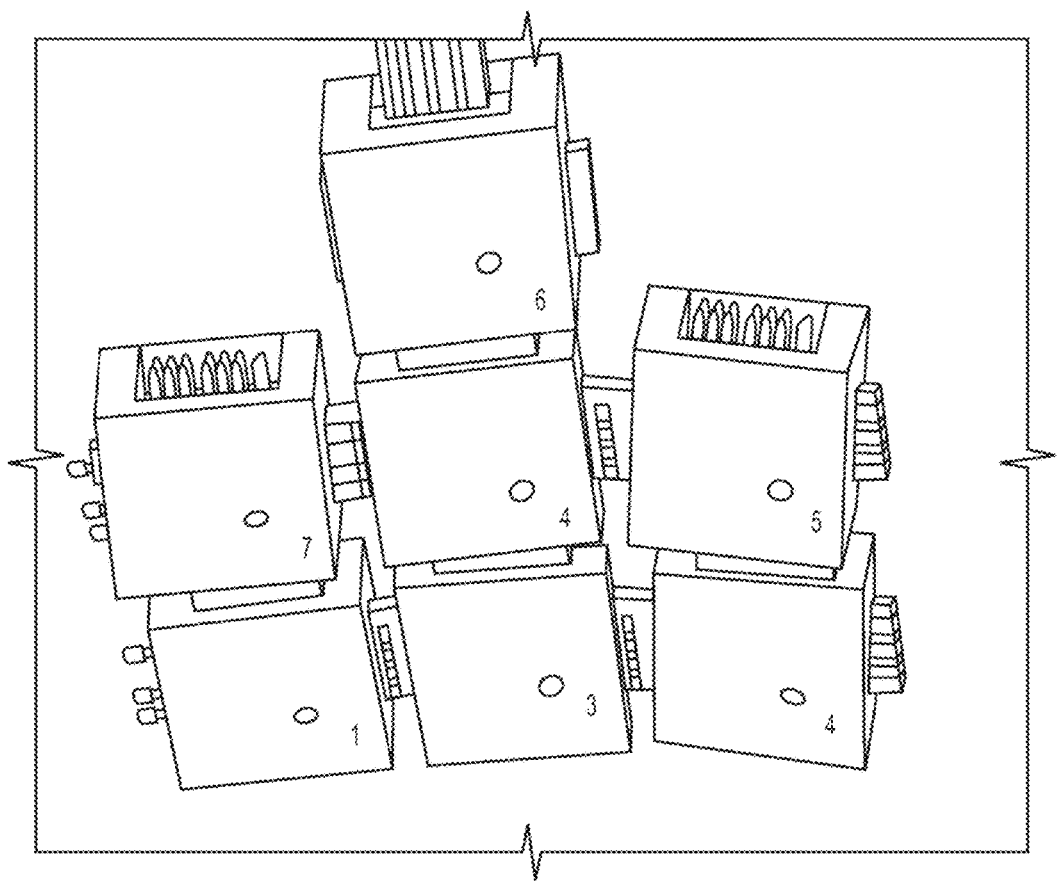
FIG. 25 illustrates modular pixels attached to form a fat monopole on a ground plane, in accordance with an embodiment of the present invention.

In some embodiments, bidirectional communication can utilize current modulation in the bidirectional link. FIGS. 22 and 24 illustrate embodiments of the present invention that implement a current limiting device (resistor shown in FIG. 22, current sink shown in FIG. 24) which allows bidirectional signaling to occur by current modulating the common line. In some embodiments, by modulating the signal in a way that pixels in parallel are not affected, communication can be achieved more simply and rapidly. A device communicating with the pixel can require the ability to source voltage and detect current. Since the amount of current which the active pixels can draw can be significant, techniques in accordance with some embodiments can reduce the overall power consumption of the antenna and the amount of power each individual pixel needs to handle for communication.

Some aspects of the present invention relate to modular A3 configurations. In some embodiments, a board with a single pixel or group of pixels can be connected together to form a larger antenna, where the connections are formed with neighboring pixel boards. The ability to connect power and digital control, or power, digital control and RF arbitrary along the edges can be leveraged to enable this implementation. In some embodiments, individual pixel boards can be connected in different patterns. Some embodiments can use boards which consist of single pixels, or boards with a very small subset of pixels. The pixels can be triangular, a square, a pentagon, a hexagon, or other arbitrary shape. The use of individual pixels can enable an A3 to be easily conformable and to be made into arbitrary shapes and sizes. Pentagons and hexagons in particular can enable practical 2D conformable reconfigurable antennas. This flexibility can allow the antenna to be fit into an available space or location and designed in situ. The size can be fixed or can be changed dynamically as needed. Interconnects between the individual boards can be fixed or flexible. Flexible connections can enable bendable reconfigurable antennas. In an embodiment of the present invention shown in FIG. 25, seven modular pixels are attached to form a fat monopole on a ground plane.

Figure 26:
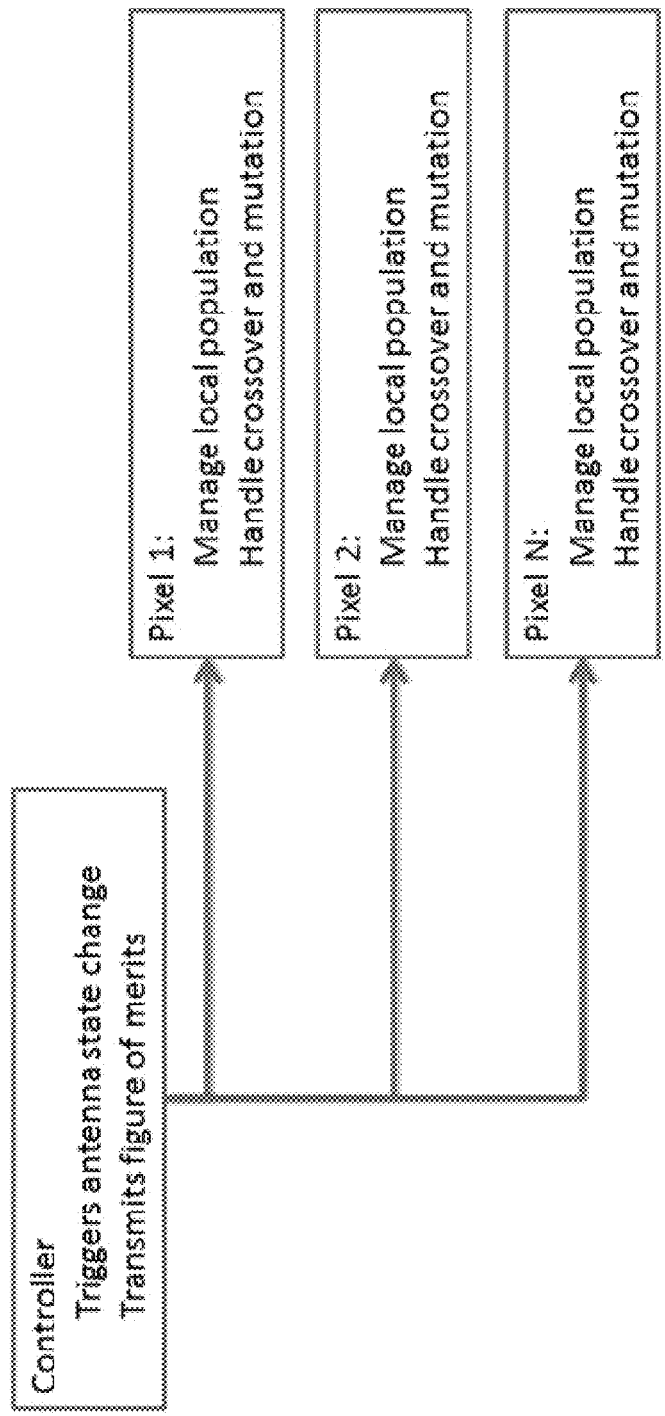
FIG. 26 illustrates an embodiment of the present invention for performing a genetic algorithm on a local pixel.

In some aspects of the present invention, a design algorithm can be implemented in part or in whole on the pixel itself. The design algorithm can be an evolutionary algorithm such as a genetic algorithm, or another algorithm such as MIMIC, Random Walk, Simulated Annealing, Particle Swarm Optimization, or Ant Colony Optimization. Iterations can be synchronized with a controller, which can provide a figure of merit. Bidirectional communication can be used to bring the switch states to a controller. Implementing the design algorithm in part or in whole on the pixel itself can dramatically decrease the design time by reducing the overall communication that happens on the antenna. FIG. 26 illustrates an embodiment of the present invention for performing much of a genetic algorithm on a local pixel, in which pixels manage the population and only require external synchronization and figures of merit for the optimization.

Some aspects of the present invention relate to embedding sensors or radios within a pixel. FIG. 23 shows an embodiment of the present invention using embedded temperature sensors. Some embodiments can utilize advantages of the complex logic and flexibility of the communication schemes provided in some embodiments of the present invention described above. The sensors can be configured to monitor the health or state of the system, or to collect external data, for example. In some embodiments, sensors can perform RF sensing, and can monitor the voltages at the pixel to monitor for issues such as too low of a voltage. In some embodiments, temperature sensors can be used to monitor temperature on the antenna surface. Some embodiments integrate cameras, IR sensors, or other monitoring devices on the antenna surface. Some embodiments integrate a radio, transmitter, receiver, detector, or digitizer in the surface of the antenna, and some embodiments integrate IMU and/or GPS into a pixel.

Some aspects of the present invention relate to using encryption or hash codes in the digital line for digital communications to or from a pixel or controller. In some embodiments, cryptographic code is used in the digital communication to or from the pixel or controller. In some embodiments, encryption may include the use of a hash code. The use of encryption in accordance with some embodiments can help prevent end users from modifying beam states, which can be useful for manufactured products. By implementing one or more of these embodiments, users can be locked from tuning the antenna to frequencies which may be illegal in some countries to receive, and certain implementations can lock users to a set of beams approved for use with the designed communication system. The implementation of some embodiments can keep users from adding particular nulling patterns, and can lock resellers from using an antenna product inconsistent with an original manufacturer's design.

Table 1 below illustrates how changing one bit on the encrypted code can cause a drastic difference in the aperture codeword, which can prevent users from discovering certain aperture codes or modifying or developing new aperture codes. The use of different keys for different customers may prevent code-sharing. Table 2 below shows RSA encryption on the same aperture code using different keys.

baseline, and switches are individually turned on and the effect measured. In another embodiment, all of the pixels are turned on as a baseline, and individual switches are toggled off and the effect is measured. Another embodiment can use a set of random patterns, measured en masse, and the results are statistically analyzed to detect failed circuitry.

In some embodiments, a collection of measured different states can be used to identify to performance of individual pixels and switches. The measured difference can be examined through frequency and evaluated based on the difference from baseline exceeding a threshold. Some embodiments can use a statistical difference of measurements over

TABLE 1

Decryption of Input Codes with One Bit Difference

| | |
|---|---|
| ░ò[HÃ⁻ñåIbý\\Ú¼AÜ¨>ẑÑÚ<U¾Å 8F?ùAÚ«ÿvëwČÇHÙ³Ó3'YS- êªýL⁻±ñ}I&vý$*—ôÅÎ$»¤< :÷'āñ2*¶*÷äˉ¬2ÏÆÑ | 86B3DBC617DCF3FDDED86DEFD8A1BEFF50423E01CA013355921C005 749536C9E53DF12A27C2731CA6BDB9FC68FEC4E0629 |
| ò[HÃ⁻ñåIbý\\Ú¼AÜ¨>ẑÑÚ <U¾Å8F?ùAÚ«ṽẽw ÖČHÙ³Ó3'Y♀*ýL⁻±ñ) I&vý$*¬ ôÅÎ$»¤<÷ 'āñ2*¶*÷äˉ¬2ÏÆÐ | 61A27E2E3A3969F7F21288305C7093BB92289D49EC9485EB20D8A1A 2F4BA38561FEE696A43F7E4E382DCED87D86A1AA47A48B91FB54862 CDA2B79F8F2726BD2F8850204F96A357575853B8C0A53BFA2AB524A 5FDA8E8B93641F8EE9EE1D6D68E16D9482CE9AF8FB821D77DB1D95E 1B95E0199E18DBFFD31D661DA85883DA3 |

TABLE 2

Encryption of Aperture Codes with Different Encryption Keys

| | |
|---|---|
| 86B3DBC617DCF3FDDED86DE FD8A1BEFF50423E01CA013355 921C005749536C9E53DF12A27C 2731CA6BDB9FC68FEC4E0629 | ╠ÑTòÄüÎuÏX·QàÀxÚö³©ýP"πpqtá:Zn%j2iäýbè14,\ÒÄ<k9ð¬_ I,\ÒÄ<k9ð¬_T±ûòÁµw.Ña¬y>i âèWἴ¢[Ï4\:mÌÐ÷ |
| 86B3DBC617DCF3FDDED86DE FD8A1BEFF50423E01CA013355 921C005749536C9E53DF12A27C 2731CA6BDB9FC68FEC4E0629 | ò[HÃ⁰⁻ñålbý\\Ú¼AÜ¨>āÑÚ<U¾Å8F?ùAÚ«ÿvẽwÖÇHÙ³Ó3'YS- êªýL⁻±ñ)'l&vý$*¬ô'ÅÎ$»|¤<:÷āñ2*¶®¸āå°¬2ÏÆÑ |

Some aspects of the present invention relate to a matrix reconfigurable antenna. In some embodiments, an array of pixel circuits and a mesh of communication lines are utilized. Some embodiments may include a row/column matrix of inductive or resistively divided lines, with each pixel connected to one row and one column. Pixel control elements can detect the combined patterns of the matrix lines to communicate to the pixels. The combinations of the matrix lines can allow pixel elements to receive individualized commands or broadcast commands. In some embodiments, three commands, namely set, reset, and no-change, can set switch states for an entire row simultaneously, by first issuing a set command to those row elements that need the switches on, and then a reset command to those elements that need the switches off, in a manner that the switches on other rows are always in the non-change mode. Such embodiments enable scanning through multiple rows, or all rows at a time, to put all switches into a desired state. Some embodiments can use a voltage detection device such as a Zener diode, and a state storage device such as a capacitor, to implement the switch controls on a pixel with minimal circuitry.

Figure 27:
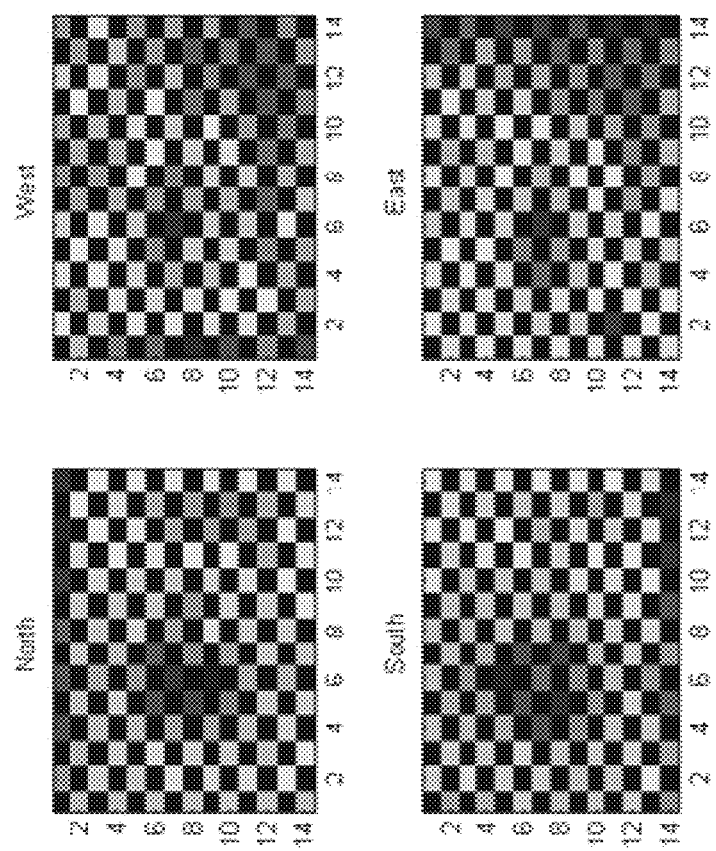
FIG. 27 illustrates a heat color chart showing an evaluation of a configuration with four switches on each pixel, in accordance with an embodiment of the present invention.
Figure 28:
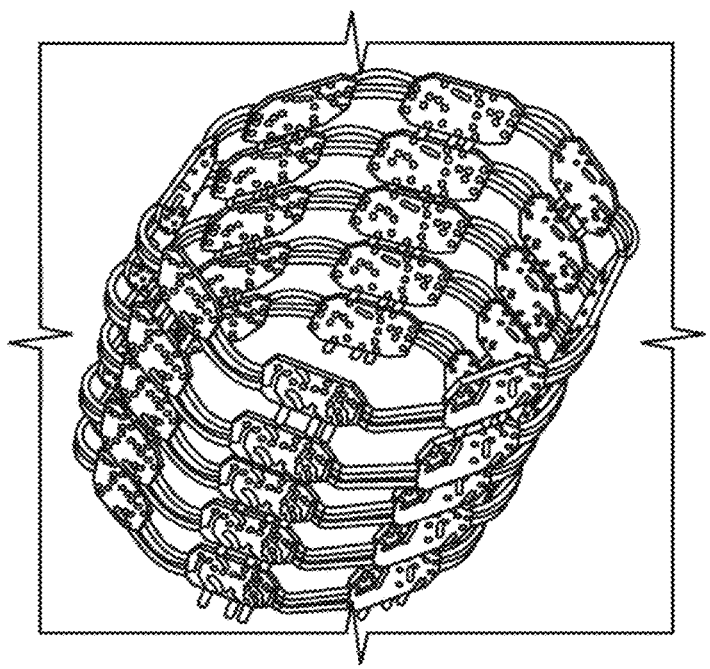
FIG. 28 illustrates a rotationally symmetric antenna according to an embodiment of the present invention.

Some aspects of the present invention relate to testing reliability of a reconfigurable antenna. Some embodiments can measure the input match, the gain, or the reflection off of the antenna as pixels are toggled through different states. In one embodiment, all of the pixels are turned off as a frequency between a candidate evaluation and the baseline. Each individual switch can be evaluated to determine if it is working. The results of such a test can be used as a pass-fail for manufacturing, can be used to identify specific components for rework, and can be used as a built-in test to verify that a system is performing in the field. FIG. 27 shows a heat color chart of the evaluation of four switches on each pixel, in accordance with an embodiment of the present invention. A single pixel has four switches indicated as North, South, West, or East. A dead switch or pixel can be identified using statistical techniques on the measurements.

In some embodiments, a toggling pixel test includes toggling individual states and evaluating change, with a fully-assembled antenna or with an antenna aperture in a test fixture, e.g., attached to a ground plane as a monopole. The tests can be used when looking for bad switches, for mapping RF energy distribution on an aperture relative to the feed (reflection mode, e.g., S11), and for mapping contribution to radiated field (transmission mode, e.g., S21). Some embodiments relate to free space characterization of an aperture. In some embodiments, a reconfigurable aperture, for example of a PCB, can be illuminated with electromagnetic radiation to characterize the electronic circuitry, for example using a focused beam system. Some embodiments relate to an aperture that is unpowered or that is powered in various states. The implementation of some embodiments can be used as a diagnostic for aperture resonances or loss that may be due to electronics or layout.

Some aspects of the present invention relate to augmented antenna calibration, in which a known measured antenna state can be used to help maintain the calibration over an extended measurement cycle. In some embodiments, a reconfigurable aperture is measured in a known state following calibration, since measurement systems may drift over time and temperature, and in some embodiments, the known state is measured again to check for drift. Some embodiments use such measurement information to signal when a new calibration may be needed. Some embodiments can account for the drift in the next set of measurements to account for changes in the measured gain. Implementation of one or more of these embodiments can thereby reduce the labor needed for optimizing the antenna over many frequencies, beam patterns, and/or polarizations. The implementation of one or more of these embodiments can normalize measurements when run over long periods of time, and can improve the consistency of measurements.

Some aspects of the present invention relate to rotationally symmetric pattern shifting. Some embodiments include, in rotationally symmetric A3s (see, e.g., rotationally symmetric antenna shown in FIG. 28), rotating or mirroring a single optimized beam code around the axis of symmetry to change the beam direction while maintaining the frequency, relative polarization, and beam shape. In some embodiments, for a beam that was optimized in a specific direction, with a specific frequency band and polarization, the code of the beam may be shifted to different elements than it was originally optimized at. If these elements are in the same geometric configuration as the original elements, the beam will form in the new direction, with the same frequency band and a polarization that is relative to the orientation of the new element configuration.

Figure 29:
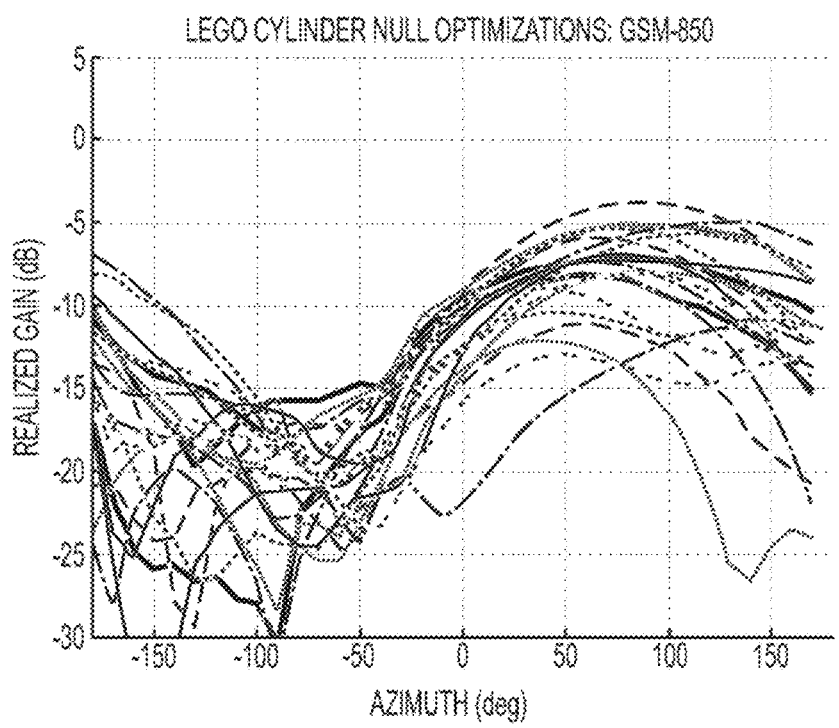
FIG. 29 illustrates aspects of rotational patterns in accordance with an embodiment of the present invention.

FIG. 29 illustrates example rotational patterns according to some aspects of the present invention. Since the antenna is rotationally symmetric, the beam patterns can be rotated by shifting the beam states around the antenna or by mirroring them. In some embodiments, certain functions place nulls with known position on a target while maintaining beam shape, frequency, and relative polarization. In some embodiments, polarization of a beam can be changed by rotating the beam while maintaining frequency, beam shape, and polarization purity. Implementations of one or more of these embodiments can provide advantages such as reducing the need for a large beam library which can be time-intensive and costly to generate.

Some aspects of the present invention relate to phase shifting with reconfigurable apertures. In some embodiments, relative phase beams replace phase shifters. In some embodiments, a library of patterns can be optimized which provide comparable gain, pattern, polarization, and/or other parameters, but differing by phase shift. In an array of antennas, such implementations can remove the requirement for a phase shifter or multiple radio taps, and therefore have a lower cost, less loss, and/or lower DC power requirements. In some embodiments, a simple combiner can be used to combine multiple reconfigurable antennas in an array. Some embodiments can digitally move a single reconfigurable antenna out of a null in a multipath environment while holding other reconfigurable parameters constant.

Some aspects of the present invention relate to tracking objects using integrated GPS and IMU with a reconfigurable antenna. In some embodiments, a reconfigurable antenna is combined with GPS and an IMU to provide real-time tracking of objects. In one implementation, a satellite can be tracked according to known position and orientation, combined with ephemeral data and running through a library of patterns. Some embodiments can track a cardinal direction and elevation, or track an object with a known position or trajectory.

Figure 30:
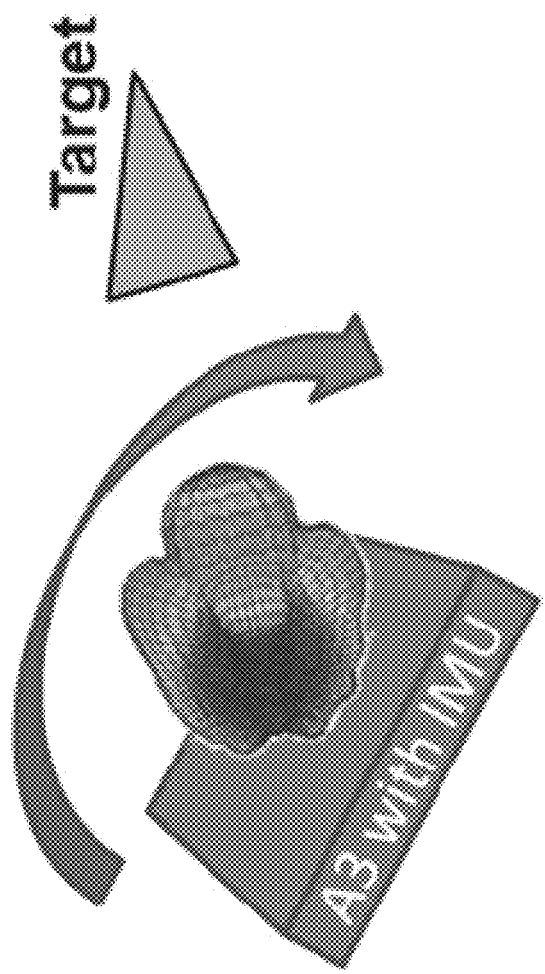
FIG. 30 illustrates aspects of in situ optimization while an antenna is moving, in accordance with an embodiment of the present invention.

Some aspects of the present invention relate to in situ optimizations while an antenna is moving. When performing in situ optimizations, a stationary environment is generally needed. In airborne or waterborne platforms this may not be possible, however, since the target may be stationary but the reconfigurable antenna is moving. Some embodiments use orientation information (such as from an IMU) and/or location information (such as from GPS) to pick out which measured data to use in an optimization generation. As the reconfigurable antenna moves, select measurements can be grouped into specific beam pattern optimizations. In this manner, in situ optimization can occur even while the antenna is moving. As shown in FIG. 30, in some embodiments of the present invention, as the antenna rolls, pitches, yaws, or otherwise changes position, knowledge of the antenna's relative orientation and/or position to the target can be used in the optimization. Measured beam state performance can be binned into similar orientation populations in the optimizer.

Some aspects of the present invention relate to in situ channel optimization. In some embodiments, in situ physical channel optimization and real time adaptation can be performed in the presence of multiple simultaneous signal sources by using figures of merit from a radio, receiver, or other detection device. The radio can discriminate sources and/or interferers using in-band signal quality figures of merit, e.g., packet loss rate, etc., while continuing to receive. In some embodiments, an adaptive optimization process is designed to minimize disruption of reception during optimization, and to prevent the occurrence of conventional performance limitations associated with the time that is required to estimate the figure of merit. Some embodiments provide advancements by the use of multiple radio systems operating in parallel to provide more accurate, less noisy, and/or more rapid feedback, thereby enabling more rapid channel improvement during adaptation. Some embodiments provide optimization using feedback from multiple simultaneous receivers having the same or different configurations (e.g., receiver diversity). Among other advantages, some embodiments provide for the ability to dynamically reject in-band interference, and the ability to respond more rapidly to channel dynamics in a mobile environment.

Some aspects of the present invention relate to weighted stored beam states. An optimal beam state at an installation can vary with the environment or cyclically over time. Certain interference sources may appear intermittently or have other intermittent radiation characteristics that demand different antenna states even when intending to communicate with the same party. In some embodiments, during operation, the quality of a beam state can be evaluated and cataloged. A statistical valuation can be assigned to that beam state for a desired source. When signal quality begins to suffer, a new beam state can be selected from a library which may include the current time or other sensory data as part of the metric. Other data that may be used for correlating the optimal beam state includes cameras, temperature, barometric pressure, weather conditions, and data scoured from other external sources. Some embodiments relate to physical channel optimization using a smart pixel reconfigurable antenna and in conjunction with sensory data that may include time, environmental conditions, and/or visual imagery. Some embodiments use a library of antenna states in conjunction with auxiliary performance data such as success rate and/or degradation pattern. Some embodiments provide a statistical model for choosing beams without knowledge of the environment.

Figure 31:
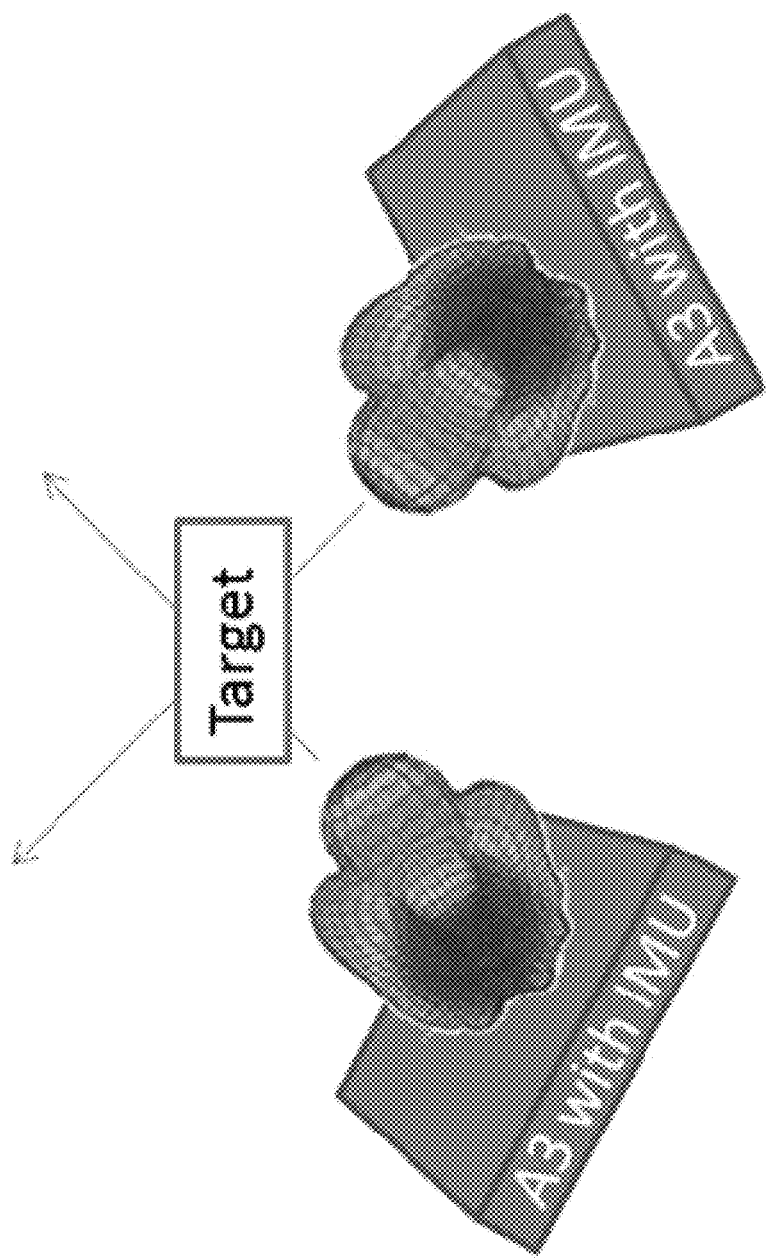
FIG. 31 illustrates the use of signals from two reconfigurable aperture antennas for triangulation of a target, in accordance with an embodiment of the present invention.

Some aspects of the present invention relate to an individual reconfigurable antenna that is capable of direction finding by itself. Some embodiments use combined steering beam measurements with known beam patterns to perform direction finding. Some implementations vector multiply the measured data with the matrix of beam patterns, to form a likelihood ratio. In some embodiments, more than one reconfigurable antenna is used simultaneously in this manner to triangulate a position. For example, some embodiments can use two A3s to triangulate position. FIG. 31 illustrates the use of the signal from two reconfigurable aperture antennas to triangulate a target signal or object in accordance with an embodiment of the present invention.

Some aspects of the present invention relate to geolocation and triangulation using one or more reconfigurable antennas on one or more moving platforms, where the reconfigurable antenna beam steering is used to augment the diversity of directional and/or locational information. In some embodiments, one reconfigurable antenna on a moving platform is used to triangulate position by translating the platform. In some embodiments, multiple reconfigurable antennas are used in cooperation on multiple moving platforms in order to rapidly triangulate/localize an emitter.

Some aspects of the present invention relate to antenna feed. Some embodiments spread out the connection to the aperture, which increases the number of switches attached to the feed. Increasing the number of switches can improve the reliability of the system, both in reducing the chance of a critical single point of failure and also in reducing the maximum RF power any one switch may have going through it. By easing the match between the feed point and the aperture, more energy can get to the aperture where the switches can affect the pattern. Additionally, an improved feed can reduce the number of degrees of freedom the antenna needs to consume for match and allows for better gain and better bandwidth. Such techniques can remove the need for a balun, thereby reducing overall cost and size of the system.

Figure 32:
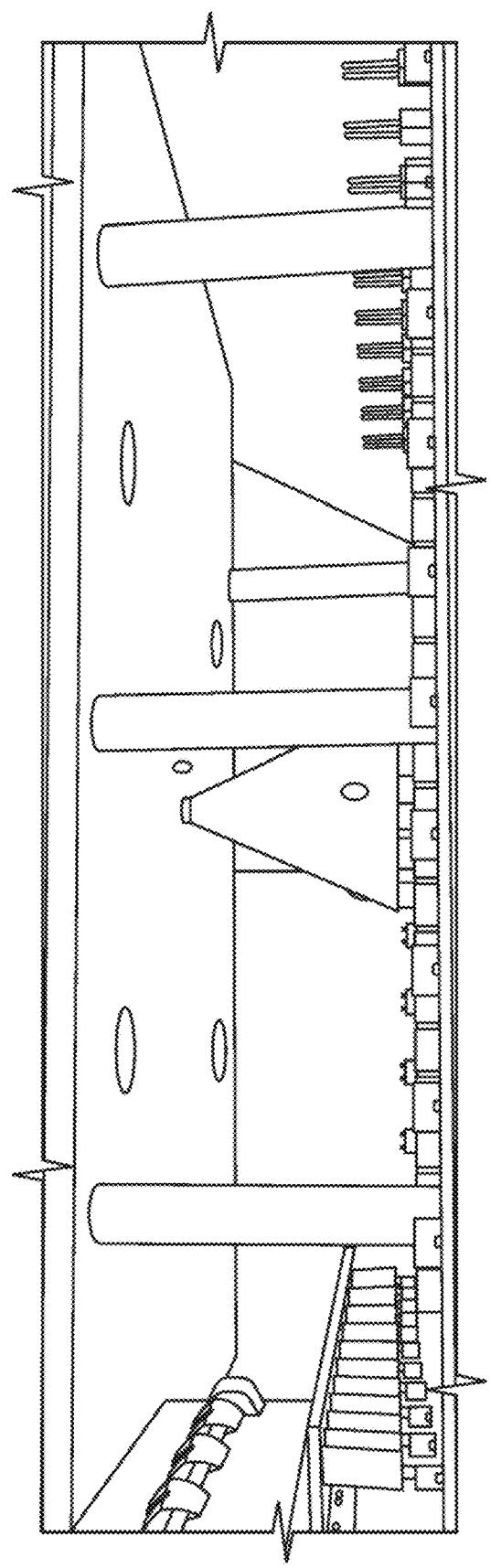
FIG. 32 illustrates a conical feed to a reconfigurable aperture, in accordance with an embodiment of the present invention.

Some embodiments can use a conical or pyramidal feed to a reconfigurable antenna. The feed can take the shape of a cone or pyramid whose narrow point is on the ground plane and whose widest point is on the aperture. Some embodiments provide a feed in the shape of an hourglass, which may be either be symmetric or asymmetric. The backplane may be conical, pyramidal, spherical, or stepped. FIG. 32 shows an embodiment of the present invention with a cone feed attached to a reconfigurable aperture.

Figure 33:
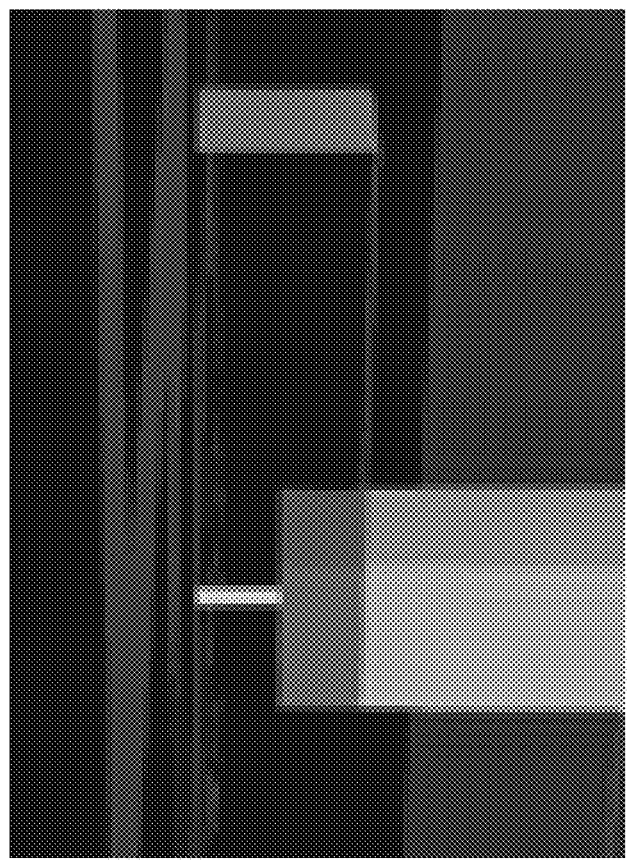
FIG. 33 illustrates an antenna connection with two lines from a coaxial feed, in accordance with an embodiment of the present invention.

Some embodiments use an unbalanced two wire feed. Some embodiments bring the center conductor of a coaxial line up to the aperture and also connect the ground plane to a nearby point on the aperture. Some embodiments bring two lines up from the ground plane, with one attached to the coaxial center conductor and one attached to the ground plane. FIG. 33 shows an embodiment of the present invention in which an antenna connects with two lines from a coaxial feed. The configurability of the antenna can adapt to the imbalance presented in the line, such that the balancing is performed by the antenna itself.

In some embodiments, the feed is a fragmented aperture, which may be directly connected to the reconfigurable aperture or spatially feeding the reconfigurable aperture. A fragmented aperture configuration can improve bandwidth and efficiency of the antenna. Some embodiments include a spatial feed using a fragmented aperture as the radiator. In some embodiments an A3 can be used as a passive director.

While several possible embodiments are disclosed above, embodiments of the present invention are not so limited. Other suitable materials and combinations of materials could be selected without departing from the spirit of embodiments of the invention. In addition, the location and configuration used for various features of embodiments of the present invention can be varied. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for a reconfigurable antenna, comprising:
a plurality of pixels, wherein at least a portion of the plurality of pixels are connectable to form a first antenna configuration, the reconfigurable antenna configured to transmit and/or receive an electromagnetic signal having a first wavelength when in the first antenna configuration, and wherein each pixel in the at least a portion of the plurality of pixels has a length and width less than the first wavelength; and
a common bus connected to each pixel of the plurality of pixels and configured to provide parallel communication between the plurality of pixels,
wherein each pixel of the plurality of pixels comprises:
a plurality of switches, and
a complex logic device connected to the common bus and configured to perform functions including controlling the switches and controlling communications with one or more other pixels of the plurality of pixels.

2. The system of claim 1, wherein the functions performed by the complex logic device further include controlling communications with one or more other devices that provide control functions for the plurality of pixels.

3. The system of claim 1, wherein the complex logic device is configured to send at least one of commands and responses to at least one of:
one or more other pixels of the plurality of pixels; and
one or more other devices providing control functions for the plurality of pixels.

4. The system of claim 1, wherein each pixel of the plurality of pixels is at least one of individually addressable and broadcast addressable via the common bus.

5. The system of claim 1, wherein the common bus is associated with a mesh of inductive or resistive lines configured to carry at least one of modulated communication signals and power to the plurality of pixels.

6. The system of claim 1, wherein controlling the communications comprises at least one of:
translating digital signals received at the pixel into switch states;
transmitting digital signals to one or more other complex logic devices; and
transmitting digital signals to one or more other pixels of the plurality of pixels.

7. The system of claim 6, wherein transmitting the digital signals to the one or more other pixels comprises transmitting, via the common bus, at least one of an individual command applicable to a specific one of the plurality of pixels and a broadcast command applicable to multiple pixels of the plurality of pixels.

8. The system of claim 1, wherein one or more of the plurality of pixels comprises a modulating device configured to modulate at least one of current and voltage for bidirectional signaling over the common bus.

9. The system of claim 1, wherein one or more pixels of the plurality of pixels comprise at least one of a temperature sensor, an inertial measurement unit (IMU), and a global positioning sensor.

10. The system of claim 1, wherein one or more pixels of the plurality of pixels are configured to perform at least one of detecting errors and correcting errors in at least one of unidirectional and bidirectional communications.

11. The system of claim 1, wherein the communications with the one or more other pixels of the plurality of pixels comprise at least one of:
    acknowledging commands;
    reporting state information;
    transmitting local sensor information;
    transmitting local switch states from memory;
    transmitting commands; and
    transmitting optimized states from pixel to controller.

12. The system of claim 1, wherein the communications with the one or more other pixels of the plurality of pixels comprise encrypted communications including cryptographic code.

13. The system of claim 1, wherein one or more pixels of the plurality of pixels are configured to perform a genetic algorithm for at least one of:
    managing local population;
    handling crossover;
    handling mutation;
    receiving figures of merit from the complex logic device; and
    receiving an indication, from the complex logic device, of an antenna state change.

14. The system of claim 1, wherein one or more of the plurality of pixels are configured to store switch state presets.

15. The system of claim 1, wherein the common bus is further configured to provide power to each of the plurality of pixels, and wherein each of the plurality of pixels is configured to separate the power from the communication provided by the common bus.

16. The system of claim 15, further comprising one or more radiating layers,
    wherein the reconfigurable antenna is configured to route the communication and the power provided by the common bus through the one or more radiating layers, and
    wherein each pixel further comprises an analog circuit configured to separate the parallel communications from the power.

17. The system of claim 1, wherein each of the plurality of pixels is configured to detect an address in a communication signal from the common bus to determine if the communication signal is intended for the pixel.

18. The system of claim 1, wherein the common bus is configured to transmit an electromagnetic control signal to each of the plurality of pixels, the electromagnetic control signal generated by a bias network including inductors and/or resistors.

19. The system of claim 18, wherein the common bus is further configured to provide a modulated signal to each of the plurality of pixels, the modulated signal distinct from the electromagnetic control signal generated by the bias network.

20. A method for configuring a reconfigurable antenna, the reconfigurable antenna including a plurality of pixels and a common bus connected to each pixel of the plurality of pixels and wherein each pixel of the plurality of pixels includes a plurality of switches and a complex logic device connected to the common bus, wherein the method comprises:
    providing, by the common bus, parallel communication between the plurality of pixels;
    controlling, by the complex logic device of each of the plurality of pixels, communications with one or more other pixels of the plurality of pixels; and
    controlling, by the complex logic device of each of the plurality of pixels, switches of the plurality of pixels to connect at least a portion of the plurality of pixels to form a first antenna configuration,
    wherein the reconfigurable antenna is configured to transmit and/or receive an electromagnetic signal having a first wavelength when in the first antenna configuration, and
    wherein each pixel in the at least a portion of the plurality of pixels has a length and width less than the first wavelength.

21. The method of claim 20, further comprising controlling, by the complex logic device, communications with one or more other devices that provide control functions for the plurality of pixels.

22. The method of claim 20, further comprising sending, by the complex logic device, at least one of commands and responses to at least one of:
    one or more other pixels of the plurality of pixels; and
    one or more other devices providing control functions for the plurality of pixels.

23. The method of claim 20, wherein controlling, by the complex logic device of each of the plurality of pixels, the communications with one or more other pixels of the plurality of pixels comprises at least one of:
    translating digital signals received at the pixel into switch states;
    transmitting digital signals to one or more other complex logic devices; and
    transmitting digital signals to one or more other pixels of the plurality of pixels.

24. The method of claim 23, wherein transmitting the digital signals to the one or more other pixels comprises transmitting, via the common bus, at least one of an individual command applicable to a specific one of the plurality of pixels and a broadcast command applicable to multiple pixels of the plurality of pixels.

25. The method of claim 20, further comprising modulating, by a modulating device of one or more of the plurality of pixels, at least one of current and voltage for bidirectional signaling over the common bus.

26. The method of claim 20, further comprising performing, by one or more pixels of the plurality of pixels, at least one of detecting errors and correcting errors in at least one unidirectional and bidirectional communications.

27. The method of claim 20, wherein controlling, by the complex logic device of each of the plurality of pixels, the communications with the one or more other pixels of the plurality of pixels comprises controlling at least one of:
    acknowledging commands;
    reporting state information;
    transmitting local sensor information;
    transmitting local switch states from memory;
    transmitting commands; and
    transmitting optimized states from pixel to controller.

28. The method of claim 20, further comprising performing, by one or more pixels of the plurality of pixels, a genetic algorithm for at least one of:
managing local population;
handling crossover;
handling mutation;
receiving figures of merit from the complex logic device; and
receiving an indication, from the complex logic device, of an antenna state change.

29. The method of claim 20, further comprising storing, by one or more of the plurality of pixels, switch state presets.

30. The method of claim 20, further comprising:
providing, by the common bus, power to each pixel of the plurality of pixels; and
separating, by each pixel of the plurality of pixels, the power provided by the common bus from the parallel communication provided by the common bus.

31. The method of claim 30, further comprising routing the common bus through one or more radiating layers of the reconfigurable antenna.

32. The method of claim 20, further comprising detecting, by each of the plurality of pixels, an address in a communication signal from the common bus to determine if the communication signal is intended for the pixel.

33. The method of claim 20, further comprising:
generating, by a bias network including inductors and/or resistors, an electromagnetic control signal; and
transmitting, by the common bus, an electromagnetic control signal to each of the plurality of pixels.

34. The method of claim 33, further comprising providing, by the common bus, a modulated signal to each of the plurality of pixels, the modulated signal distinct from the electromagnetic control signal generated by the bias network.

35. A system for a reconfigurable antenna, comprising:
a first selectively connectable reconfigurable antenna module, comprising:
one or more pixels, each comprising a plurality of switches and a complex logic device, the complex logic device configured to perform functions including controlling the plurality of switches of each pixel in the one or more pixels of the first selectively connectable reconfigurable antenna module and controlling communications to and/or from each pixel of the first selectively connectable reconfigurable antenna module; and
a first common bus connected to the complex logic device of each pixel of the first selectively connectable reconfigurable antenna module and configured to provide parallel communication between the one or more pixels of the first selectively connectable reconfigurable antenna module; and
a second selectively connectable reconfigurable antenna module, comprising:
one or more pixels, each comprising a plurality of switches and a complex logic device, the complex logic device configured to perform functions including controlling the plurality of switches of each pixel in the one or more pixels of the second selectively connectable reconfigurable antenna module and controlling communications to and/or from each pixel of the second selectively connectable reconfigurable antenna module; and
a second common bus connected to the complex logic device of each pixel of the second selectively connectable reconfigurable antenna module and configured to provide parallel communication between the one or more pixels of the second selectively connectable reconfigurable antenna module,
wherein the first common bus and the second common bus are connectable to provide parallel communication between the one or more pixels of the first selectively connectable reconfigurable antenna and the one or more pixels of the second selectively connectable reconfigurable antenna,
wherein at least a portion of the one or more pixels of the first selectively connectable reconfigurable antenna and at least a portion of the one or more pixels of the second selectively connectable reconfigurable antenna are connectable to form a first antenna configuration,
wherein the first and second selectively connectable reconfigurable antenna modules are configured to transmit and/or receive an electromagnetic signal having a first wavelength when the at least a portion of the one or more pixels of the first selectively connectable reconfigurable antenna and the at least a portion of the one or more pixels of the second selectively connectable reconfigurable antenna are in the first antenna configuration, and
wherein each of the first and second selectively connectable reconfigurable antenna modules has a length and width less than the first wavelength.

36. The system of claim 35, wherein the first selectively connectable reconfigurable antenna module has a first predefined geometric shape selected to connect to the second selectively connectable reconfigurable antenna module having a second predefined geometric shape.

37. The system of claim 35, wherein the first antenna configuration is a three-dimensional geometric pattern.

38. The system of claim 35, wherein each of the first and second common buses is associated with a mesh of inductive or resistive lines configured to carry at least one of modulated communication signals and power between connected modules of the plurality of modules.

39. The system of claim 35, wherein each the first selectively connectable reconfigurable antenna module is configured to connect with the second selectively connectable reconfigurable antenna module to provide there between at least one of:
power and digital control; and
power, digital control, and RF communication.

40. The system of claim 35, wherein the first common bus is further configured to provide power to each of the one or more pixels of the first selectively connectable reconfigurable antenna module, and wherein the second common bus is further configured to provide power to each of the one or more pixels of the second selectively connectable reconfigurable antenna module, wherein each pixel in the one or more pixels of the first and second selectively connectable reconfigurable antenna models is configured to separate the power from the communication provided by the first and second common buses.

41. The system of claim 40, wherein the first selectively connectable reconfigurable antenna module further comprises a first radiating layer and the second selectively connectable reconfigurable antenna module further comprises a second radiating layer,
wherein the first common bus is routed through the first radiating layer and wherein the second common bus is routed through the second radiating layer, and
wherein each of the one or more pixels in the first and second selectively connectable reconfigurable antenna modules comprises an analog circuit configured to separate the power from the communication provided by the first and second common buses.

42. The system of claim 35, wherein each of the one or more pixels in the first and second selectively connectable reconfigurable antenna modules is configured to detect an address in a communication signal from the first and/or second common buses to determine if the communication signal is intended for the pixel.

43. The system of claim 35, wherein the first common bus is further configured to transmit a first electromagnetic control signal to each of the one or more pixels in the first selectively connectable reconfigurable antenna module, the first electromagnetic control signal generated by a first bias network including inductors and/or resistors, and wherein the second common bus is further configured to transmit a second electromagnetic control signal to each of the one or more pixels in the second selectively connectable reconfigurable antenna module, the second electromagnetic control signal generated by a second bias network including inductors and/or resistors.

44. The system of claim 43, wherein the first common bus is further configured to provide a first modulated signal to each of the one or more pixels in the first selectively connectable reconfigurable antenna module, the first modulated signal distinct from the first electromagnetic control signal generated by the first bias network, and wherein the second common bus is further configured to provide a second modulated signal to each of the one or more pixels in the second selectively connectable reconfigurable antenna module, the second modulated signal distinct from the second electromagnetic control signal generated by the second bias network.

\* \* \* \* \*